(12) United States Patent
Evangelista et al.

(10) Patent No.: US 11,475,652 B2
(45) Date of Patent: Oct. 18, 2022

(54) AUTOMATIC REPRESENTATION TOGGLING BASED ON DEPTH CAMERA FIELD OF VIEW

(71) Applicant: Samsung Electronics Co., Ltd., Suwon-si (KR)

(72) Inventors: Edgar C. Evangelista, San Jose, CA (US); Aaron S. Faucher, San Mateo, CA (US); Jaehyun Kim, San Francisco, CA (US); Andrew R McHugh, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/361,153

(22) Filed: Jun. 28, 2021

(65) Prior Publication Data

US 2021/0407215 A1 Dec. 30, 2021

Related U.S. Application Data

(60) Provisional application No. 63/046,502, filed on Jun. 30, 2020.

(51) Int. Cl.
*G06T 15/00* (2011.01)
*G06T 19/20* (2011.01)
(Continued)

(52) U.S. Cl.
CPC .............. *G06T 19/20* (2013.01); *G06T 15/30* (2013.01); *G06T 19/006* (2013.01);
(Continued)

(58) Field of Classification Search
CPC .............................. G06T 19/006; G06T 19/20
See application file for complete search history.

(56) References Cited

U.S. PATENT DOCUMENTS 8,379,101 B2 2/2013 Mathe et al.
8,416,276 B2 4/2013 Kroll et al.
(Continued)

FOREIGN PATENT DOCUMENTS

EP 2880858 B1 6/2020
JP 2020-136921 A 8/2020
(Continued)

OTHER PUBLICATIONS

International Search Report & Written Opinion dated Oct. 12, 2021 for International Application PCT/KR2021/008355 from Korean Intellectual Property Office, pp. 1-9, Republic of Korea.
(Continued)

*Primary Examiner* — Charles Tseng
(74) *Attorney, Agent, or Firm* — Sherman IP LLP; Kenneth L. Sherman; Hemavathy Perumal

(57) ABSTRACT

One embodiment provides a method comprising determining a spatial relationship between an augmented reality (AR) device and a camera-equipped device. The AR device is worn by a user. The camera-equipped device is positioned within proximity of the user. The method further comprises determining a position of the user relative to a field of view of the camera-equipped device, and providing a representation of the user for display. The representation automatically switches between a real image of the user and a virtual avatar of the user based on the position of the user.

20 Claims, 24 Drawing Sheets

(51) Int. Cl.
*G06T 19/00* (2011.01)
*G06T 15/30* (2011.01)

(52) U.S. Cl.
CPC .. *G06T 2215/16* (2013.01); *G06T 2219/2004* (2013.01); *G06T 2219/2021* (2013.01)

(56) References Cited

U.S. PATENT DOCUMENTS

| | | | |
|---|---|---|---|
| 8,970,656 | B2 | 3/2015 | Goodman et al. |
| 9,310,612 | B2 | 4/2016 | Cho et al. |
| 9,727,473 | B2 | 8/2017 | Dees et al. |
| 9,728,010 | B2 | 8/2017 | Thomas et al. |
| 9,838,573 | B2 | 12/2017 | Choi et al. |
| 10,175,483 | B2 | 1/2019 | Salter et al. |
| 10,175,492 | B2 | 1/2019 | Li et al. |
| 10,354,449 | B2 | 7/2019 | Todeschini |
| 10,546,181 | B2 | 1/2020 | Schickel et al. |
| 10,757,368 | B2 | 8/2020 | Lyren |
| 2012/0309532 | A1 | 12/2012 | Ambrus et al. |
| 2015/0070274 | A1 | 3/2015 | Morozov |
| 2015/0215581 | A1 | 7/2015 | Barzuza et al. |
| 2016/0027212 | A1 | 1/2016 | Da Veiga et al. |
| 2017/0069071 | A1 | 3/2017 | Jung |
| 2019/0320144 | A1 | 10/2019 | Tong et al. |
| 2019/0342507 | A1* | 11/2019 | Dye ................. H04N 5/232935 |
| 2020/0265627 | A1 | 8/2020 | Seo et al. |
| 2021/0209853 | A1* | 7/2021 | Min ........................... G06T 7/70 |
| 2021/0382544 | A1* | 12/2021 | Butcher ................. G06T 13/40 |
| 2022/0005215 | A1 | 1/2022 | Evangelista et al. |

FOREIGN PATENT DOCUMENTS

| | | |
|---|---|---|
| JP | 2020184695 A | 11/2020 |
| KR | 2016-0133230 A | 11/2016 |
| KR | 1705025 B1 | 2/2017 |
| KR | 20180038175 A | 4/2018 |
| KR | 20190087764 A | 7/2019 |
| WO | 2017/065348 A1 | 4/2017 |
| WO | 2018/106198 A1 | 6/2018 |

OTHER PUBLICATIONS

Pece, F. et al., "Adapting Standard Video Codecs for Depth Streaming", Joint Virtual Reality Conference of EuroVR—EGVE, 2011, 4 pages, downloaded Jun. 28, 2021 from: http://reality.cs.ucl.ac.uk/projects/depth-streaming/depth-streaming.pdf, The Eurographics Association.

Wilson, A.D., "Fast Lossless Depth Image Compression", Oct. 17, 2017, p. 100-105, downloaded Jun. 28, 2021 from: https://www.microsoft.com/en-us/research/uploads/prod/2018/09/p100-wilson.pdf, ACM, United Kingdom.

Finley, M.G., "Variable precision depth encoding for 3D range geometry compression", 2020, pp. 5290-5299, vol. 59, issue 17, downloaded Jun. 28, 2021 at https://www.osapublishing.org/ao/abstract.cfm?uri=ao-59-17-5290 (Abstract Only).

Reed, N., "Depth Precision Visualized", Jul. 15, 2015, 4 pages, downloaded Jun. 28, 2021 from: https://developer.nvidia.com/content/depth-precision-visualized, NVIDIA Developer.

International Search Report & Written Opinion dated Mar. 18, 2022 for International Application PCT/KR2021/013516 from Korean Intellectual Property Office, pp. 1-11, Republic of Korea.

* cited by examiner

AUTOMATIC REPRESENTATION TOGGLING BASED ON DEPTH CAMERA FIELD OF VIEW

CROSS REFERENCE TO RELATED APPLICATIONS

This application claims priority from U.S. Provisional Patent Application Ser. No. 63/046,502, filed on Jun. 30, 2020, incorporated herein by reference.

TECHNICAL FIELD

One or more embodiments relate generally to augmented reality, and in particular, automatic representation toggling based on depth camera field of view.

BACKGROUND

Augmented reality (AR) is an enhanced version of the real physical world that is achieved through the use of digital visual elements, sound, or other sensory stimuli delivered via technology.

SUMMARY

One embodiment provides a method comprising determining a spatial relationship between an augmented reality (AR) device and a camera-equipped device. The AR device is worn by a user. The camera-equipped device is positioned within proximity of the user. The method further comprises determining a position of the user relative to a field of view of the camera-equipped device, and providing a representation of the user for display. The representation automatically switches between a real image of the user and a virtual avatar of the user based on the position of the user.

These and other features, aspects and advantages of the one or more embodiments will become understood with reference to the following description, appended claims and accompanying figures.

DETAILED DESCRIPTION

Figure 1:
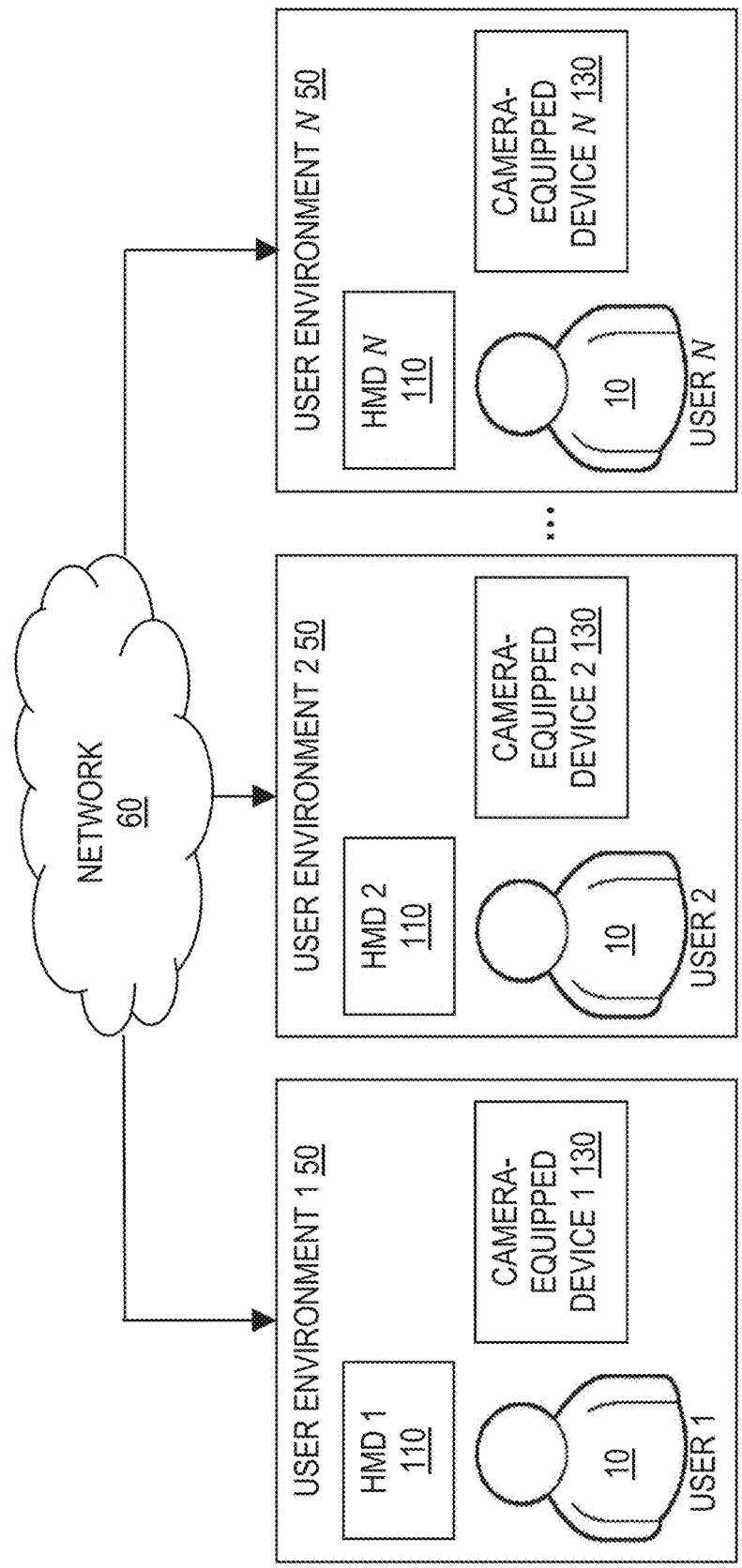
FIG. 1 illustrates an example computing architecture for implementing automatic representation toggling based on depth camera field of view, in one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to augmented reality, and in particular, automatic representation toggling based on depth camera field of view. One embodiment provides a method comprising determining a spatial relationship between an augmented reality (AR) device and a camera-equipped device. The AR device is worn by a user. The camera-equipped device is positioned within proximity of the user. The method further comprises determining a position of the user relative to a field of view of the camera-equipped device, and providing a representation of the user for display. The representation automatically switches between a real image of the user and a virtual avatar of the user based on the position of the user.

For expository purposes, the term "video call" as used in this specification generally refers to reception and transmission of audio-video signals by users in different locations, for communication between people in real time.

A holographic call ("holocall") is an example augmented reality (AR) application use case that involves an AR, immersive, volumetric video call between multiple users. The video call involves streaming RGB and depth image frames between devices of the users across a network. Users typically utilize at least an augmented reality/virtual reality (AR/VR) headset and a mobile phone for a video call. One user captures real-time images of themselves via a camera of the mobile phone, and another user views the user in stereoscopic 3D via the AR/VR headset.

For example, a pair of users can each wear a pair of AR glasses, position their mobile phone in front of them, and initiate a holocall between themselves. A mobile phone positioned in front of a first user captures video of the first user via a camera of the mobile phone. The mobile phone transmits the captured video including color (RGB) image frames and depth image frames to a pair of AR glasses worn by a second user. The pair of AR glasses renders a live 3D image of the first user, where the live 3D image is reconstructed by displacing the RGB image frames based on the depth image frames. During the holocall, the first user may walk around and even walk outside of a field of view (FOV) of the camera of the mobile phone. With conventional technologies, when the first user walks outside of the FOV of the camera, there is no live 3D image of the first user to render on the pair of AR glasses worn by the second user.

Embodiments of the invention provide a method and system of providing a representation of a user for display during a video call, where the representation automatically toggles between a real image (depth video) of the user and a virtual avatar of the user based on a position of the user in a field of view of a camera capturing video of the user. Embodiments of the invention allow the user to move around during the video call without having to move the camera as a virtual avatar of the user is displayed whenever the user is not visible to the camera.

FIG. 1 illustrates an example computing architecture 100 for implementing automatic representation toggling based on depth camera field of view, in one or more embodiments. The computer architecture 100 provides a framework for a holocall between two or more users 10, such as a first user 10 (USER 1), a second user 10 (USER 2), . . . , and a N$^{th}$ user 10 (USER N). For each user 10, the computer architecture 100 comprises at least a corresponding head-mounted display (HMD) 110 and a corresponding camera-equipped device 130, wherein the HMD 110 and the camera-equipped device 130 are paired devices in a user environment 50 of the user 10.

For example, a first user environment 50 (USER ENVIRONMENT 1) of the first user 10 (USER 1) includes a first HMD 110 (HMD 1) and a first camera-equipped device 130 (CAMERA-EQUIPPED DEVICE 1), a second user environment 50 (USER ENVIRONMENT 2) of the second user 10 (USER 2) includes a second HMD 110 (HMD 2) and a second camera-equipped device 130 (CAMERA-EQUIPPED DEVICE 2), . . . , and a N$^{th}$ user environment 50 (USER ENVIRONMENT N) of the N$^{th}$ user 10 (USER N) includes a N$^{th}$ HMD 110 (HMD N) and a N$^{th}$ camera-equipped device 130 (CAMERA-EQUIPPED DEVICE N).

Examples of a HMD 110 include, but are not limited to, a pair of AR glasses, an AR/VR headset, etc.

Examples of a camera-equipped device 130 include, but are not limited to, a television (e.g., a smart television), a mobile electronic device (e.g., a tablet, a smart phone, a laptop, etc.), a standalone camera, a wearable device (e.g., a smart watch, a smart band, a head-mounted display, smart glasses, etc.), an Internet of things (IoT) device, etc.

As described in detail later herein, in one embodiment, a HMD 110 and a camera-equipped device 130 in the same user environment 50 are configured to exchange data with each other over a local network connection (e.g., a wireless connection such as a Wi-Fi connection or a cellular data connection, a wired connection, or a combination of the two). Each HMD 110/camera-equipped device 130 in a user environment 50 is configured to exchange data with another HMD 110/camera-equipped device 130 in another user environment 50 over a network 60 via a remote network connection (e.g., a wireless connection such as a Wi-Fi connection or a cellular data connection, a wired connection, or a combination of the two).

In one embodiment, during a video call (e.g., a holocall), a camera-equipped device 130 corresponding to a user 10 is positioned within proximity of the user 10, and a HMD 110 corresponding to the same user 10 is worn by the user 10. Each user 10 is in their own space (i.e., a user environment 50 of the user 10). If a user 10 initiates a video call with another user 10, a representation of the user 10 from their own space is virtually transported to a space of the other user 10 utilizing a HMD 110 and/or a camera-equipped device 130 corresponding to each user 10.

Figure 2:
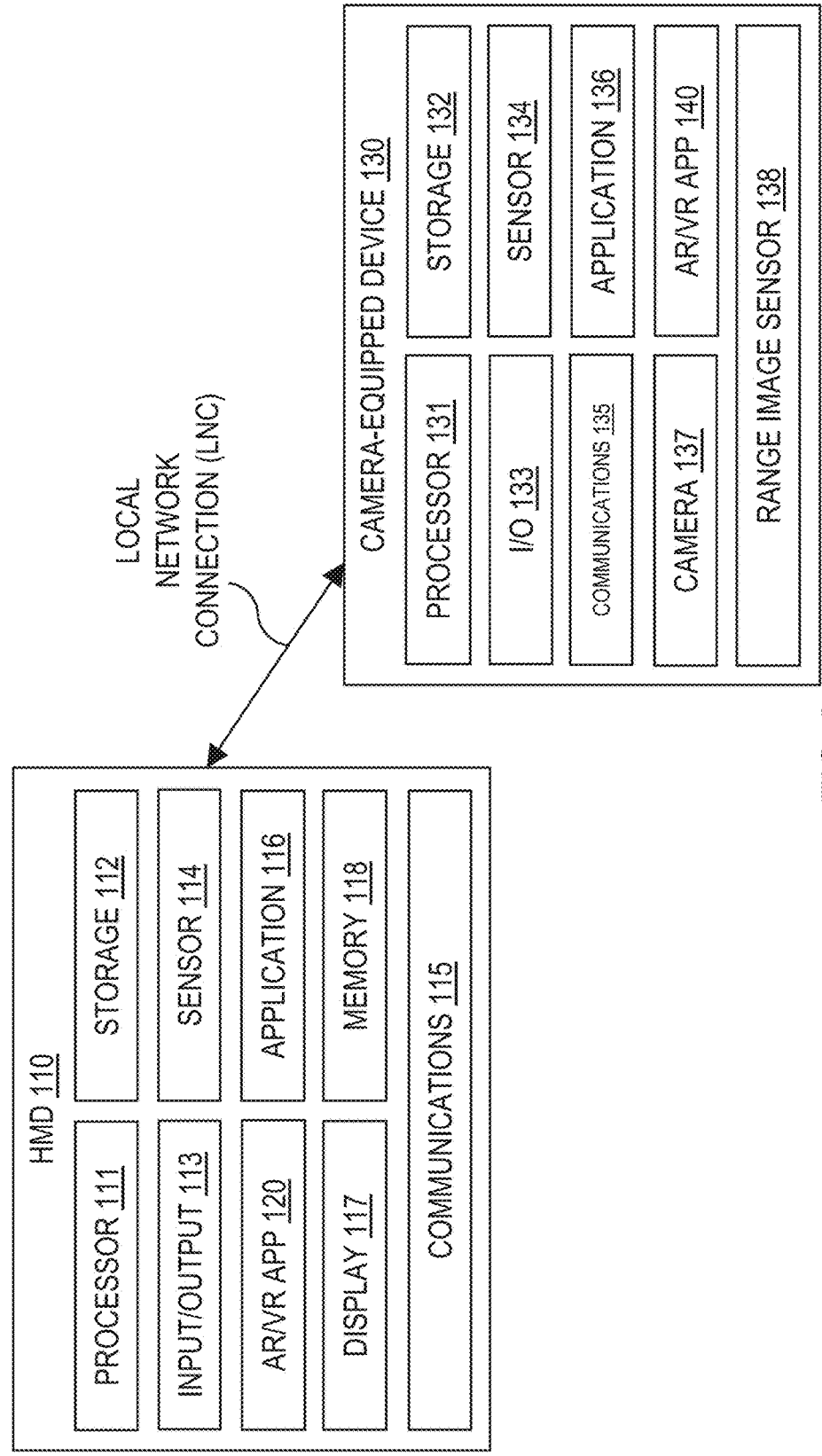
FIG. 2 illustrates an example head-mounted display (HMD) and an example camera-equipped device in a user environment, in one or more embodiments.

FIG. 2 illustrates an example HMD 110 and an example camera-equipped device 130 in a user environment 50, in one or more embodiments. In one embodiment, the HMD 110 includes resources, such as one or more processor units 111, one or more storage units 112, and one or more memory units 118. One or more applications 116 may execute/operate on the HMD 110 utilizing the resources of the HMD 110. In one embodiment, the one or more applications 116 include an AR/VR application 120 (FIG. 5) for video calls. The AR/VR application 120 is configured to: (1) receive captured video captured by a camera 137 of a camera-equipped device 130 located in a different user environment 50 ("remote camera-equipped device 130"), and (2) render, on an AR display 117 of the HMD 110, a live 3D image of a user 10 located in the different user environment 50 ("remote user 10") based on the captured video.

As described in detail later herein, in one embodiment, the AR/VR application 120 is configured to render a live 3D image with automatic representation toggling enabled. Automatic representation toggling involves rendering any portion of the remote user 10 visible in the captured video as a real image/depth video (i.e., depth video representation), and rendering any remaining portion of the remote user 10 not visible in the captured video as a virtual avatar (i.e., avatar representation). If automatic representation toggling is enabled, the AR/VR application 120 is configured to toggle between rendering an avatar representation of the remote user 10 or a depth video representation of the user 10 based on a position of the remote user 10 relative to a field of view of the camera 137 of the remote camera-equipped device 130.

In one embodiment, the HMD 110 comprises one or more sensor units 114 integrated in or coupled to the HMD 110. In one embodiment, the one or more sensor units 114 include a GPS, a motion sensor, etc.

In one embodiment, the HMD 110 comprises one or more input/output (I/O) units 113 integrated in or coupled to the HMD 110. In one embodiment, the one or more I/O units 113 include the AR display 117.

In one embodiment, the HMD 110 comprises a communications unit 115 configured to exchange data with a camera-equipped device 130 in the same user environment 50 over a local network connection (e.g., a wireless connection such as a Wi-Fi connection or a cellular data connection, a wired connection, or a combination of the two). The communications unit 115 is further configured to exchange data with a remote device, such as the remote camera-equipped device 130 or a different HMD device 110 in the different user environment 50 ("remote HMD device 110"), over a remote network connection (e.g., a wireless connection such as a Wi-Fi connection or a cellular data connection, a wired connection, or a combination of the two). The communications unit 115 may comprise any suitable communications circuitry operative to connect to a communications network and to exchange communications operations and media between the HMD 110 and other devices connected to the same communications network. The communications unit 115 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the camera-equipped device 130 includes resources, such as one or more processor units 131 and one or more storage units 132. One or more applications 136 may execute/operate on the camera-equipped device 130 utilizing the resources of the camera-equipped device 130. In one embodiment, the one or more applications 136 include an AR/VR application 140 for video calls. In one embodiment, the AR/VR application 140 is configured to: (1) capture, via a camera 137 of the camera-equipped device 130, video, wherein the captured video may include real-time images of a user 10 positioned within proximity of the camera-equipped device 130 ("local user 10"), (2) exchange data with the AR/VR application 120 on the HMD 110 in the same user environment 50, and (3) exchange data including the captured video with an AR/VR application 120 on the remote HMD 110 and/or an AR/VR application 140 on the remote camera-equipped device 130.

In one embodiment, the camera-equipped device 130 comprises one or more sensor units 134 integrated in or coupled to the camera-equipped device 130. In one embodiment, the one or more sensor units 134 include the camera 137 and a range image sensor 138. The one or more sensor units 134 optionally include a GPS, a motion sensor, etc.

In one embodiment, the camera 137 includes both a depth camera and a RGB camera, such that captured video includes RGB and depth image frames.

In one embodiment, the camera-equipped device 130 comprises one or more I/O units 133 integrated in or coupled to the camera-equipped device 130. In one embodiment, the one or more I/O units 133 include, but are not limited to, a physical user interface (PUI) and/or a GUI, such as a keyboard, a keypad, a touch interface, a touch screen, a knob, a button, a display screen, etc. In one embodiment, the local user 10 can utilize at least one I/O unit 133 to configure one or more user preferences, configure one or more parameters, provide input, etc.

In one embodiment, the camera-equipped device 130 comprises a communications unit 135 configured to exchange data with the HMD 110 in the same user environment 50 over a local network connection (e.g., a wireless connection such as a Wi-Fi connection or a cellular data connection, a wired connection, or a combination of the two). The communications unit 135 is further configured to exchange data with a remote device, such as the remote HMD device 110 or the remote camera-equipped device 130, over a remote network connection (e.g., a wireless connection such as a Wi-Fi connection or a cellular data connection, a wired connection, or a combination of the two). The communications unit 135 may comprise any suitable communications circuitry operative to connect to a communications network and to exchange communications operations and media between the camera-equipped device 130 and other devices connected to the same communications network. The communications unit 135 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In one embodiment, the one or more applications 136 on the camera-equipped device 130 may further include one or more software mobile applications loaded onto or downloaded to the camera-equipped device 130, such as a camera application, a social media application, etc.

Figure 3:
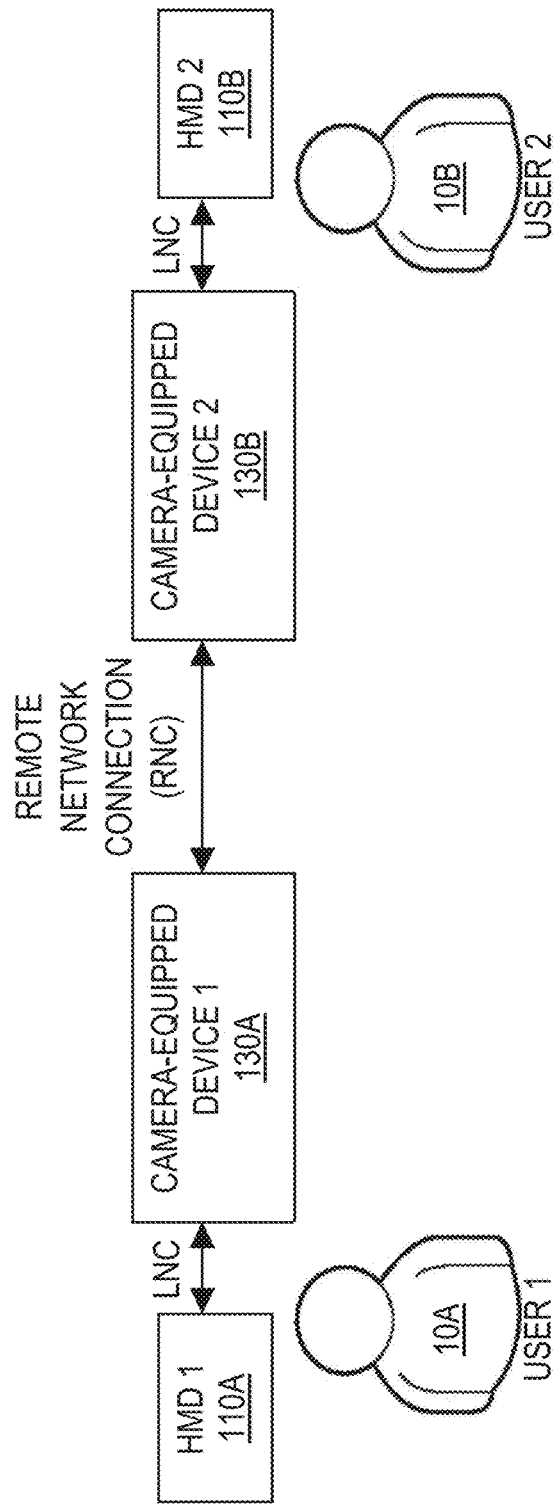
FIG. 3 illustrates an example system for automatic representation toggling, in one or more embodiments.

FIG. 3 illustrates an example system 200 for automatic representation toggling, in one or more embodiments. The system 200 comprises a first HMD 110A (HMD 1) and a first camera-equipped device 130A (CAMERA-EQUIPPED DEVICE 1) paired together in a first user environment (e.g., user environment 50 in FIG. 1) of a first user 10A (USER 1). The first HMD 110A and the first camera-equipped device 130A exchange data with each other over a local network connection (LNC).

The system 200 further comprises a second HMD 110B (HMD 2) and a second camera-equipped device 130B (CAMERA-EQUIPPED DEVICE 2) paired together in a second user environment (e.g., user environment 50 in FIG. 1) of a second user 10B (USER 2). The second HMD 110B and the second camera-equipped device 130B exchange data with each other over a LNC. The first camera-equipped device 130A and the second camera-equipped device 130B exchange data with each other over a remote network connection (RNC).

In one embodiment, the system 200 is implemented using the computer architecture 100. For example, in one embodiment, each HMD 110A, 110B is a HMD 110 (FIG. 1), each camera-equipped device 130A, 130B is a camera-equipped device 130 (FIG. 1), and each user 10A, 10B is a user 10 (FIG. 1).

Figure 4:
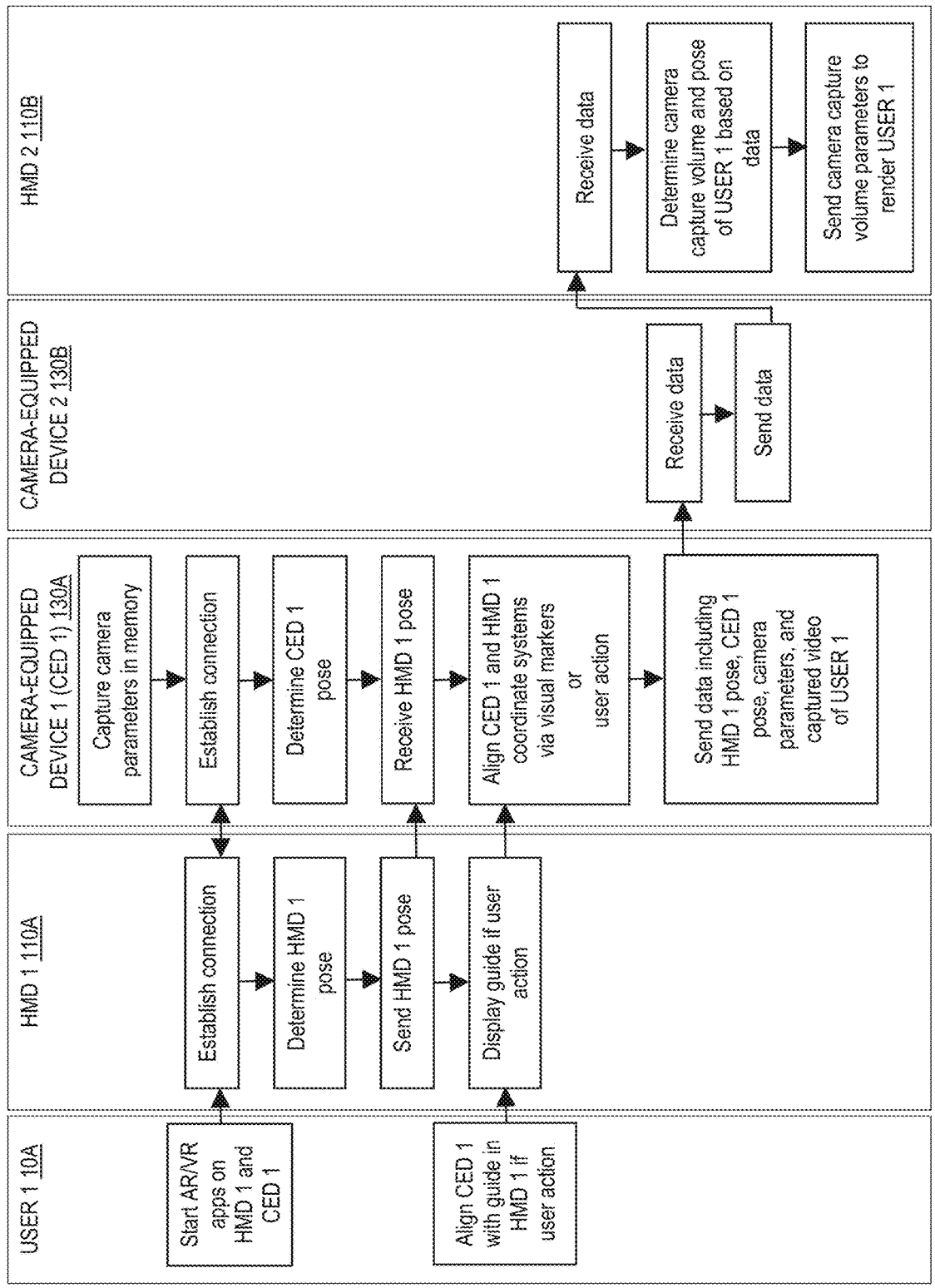
FIG. 4 illustrates an example workflow implemented using the system, in one or more embodiments.

FIG. 4 illustrates an example workflow implemented using the system 200, in one or more embodiments. To initiate a video call session with the second user 10B (FIG. 3), a first user 10A starts an AR/VR application 120 (FIG. 2) on the first HMD 110A and an AR/VR application 140 (FIG. 2) on the first camera-equipped device 130A. In response to the first user 10 starting the AR/VR application 120 on the first HMD 110A, the AR/VR application 120 is configured to: (1) establish a connection with the first camera-equipped device 130A, (2) determine a physical pose of the first HMD 110A using system/OS methods, and (3) send the physical pose of the first HMD 110A to the first camera-equipped device 130A. For example, in one embodiment, the AR/VR application 120 uses visual slam to calculate the physical pose of the first HMD 110A relative to an arbitrary world-space origin in virtual coordinate space. In one embodiment, the AR/VR application 120 tracks the head, one or more extremities (e.g., hands), and/or skeleton of the first user 10A.

In response to the first user 10 starting the AR/VR application 140 on the first camera-equipped device 130A, the AR/VR application 140 is configured to: (1) capture a set of camera parameters of a camera 137 (FIG. 2) of the first camera-equipped device 130A, (2) establish a connection with the first HMD 110A, (3) determine a physical pose of the first camera-equipped device 130A using system/OS methods, and (4) receive a physical pose of the first HMD 110A (e.g., from the AR/VR application 120 on the first HMD 110A). In one embodiment, the set of camera parameters is indicative of a field of view (i.e., camera frustum) of the camera 137, a defined near clipping plane, and a defined far clipping plane. In one embodiment, the set of camera parameters is cached/saved in a memory of the first camera-equipped device 130A at the start of the session. In one embodiment, the AR/VR application 140 uses an object detection and pose estimation algorithm to estimate the physical pose of the first camera-equipped device 130A.

In one embodiment, a range image sensor 138 of the first camera-equipped device 130A is used to determine the field of view of the camera 137 and accompanying distance data (i.e., near and far clipping planes).

In one embodiment, the AR/VR application 120 on the first HMD 110A is configured to perform an initial calibration against a position of the first camera-equipped device 130A to determine a spatial relationship between the paired devices and align the physical first camera-equipped device 130A in the virtual coordinate space. Specifically, the AR/VR application 120 is configured to render an AR user interface (UI) representing a virtual guide/transform on an AR display 117 (FIG. 2) of the first HMD 110A. In one embodiment, the initial calibration is performed based on user action. For example, in one embodiment, the user action comprises the first user 10A manually aligning the virtual guide/transform with the physical pose of the camera-equipped device 130A. As another example, in one embodiment, the user action comprises the first user 10A aligning the first camera-equipped device 130A with the virtual guide/transform.

In one embodiment, the initial calibration is performed without user action. Specifically, the AR/VR application 140 on the first camera-equipped device 130A is configured to display one or more visual markers (e.g., a fiducial) on a display screen of the first camera-equipped device 130A that automatically aligns the virtual transform with the physical pose of the first camera-equipped device 130A.

In one embodiment, the AR/VR application 120 on the first HMD 110A maintains, based on the initial calibration, transform data indicative of a location and rotation of the first camera-equipped device 130A, and a spatial map of a physical world of the first user 10A (i.e., user environment/own space of the first user 10A).

In one embodiment, the AR/VR application 140 on the first camera-equipped device 130A is configured to capture, via the camera 137, video of the first user 10A during the session. The captured video comprises image frames across different channels, such as color channels (RGB), an alpha (A) channel, and a depth (D) channel.

In one embodiment, the AR/VR application 140 on the first camera-equipped device 130A is configured to send the physical pose of the first HMD 110A, the physical pose of the first camera-equipped device 130A, the set of camera parameters, and the captured video to the second camera-equipped device 130B over a remote network connection.

In one embodiment, the second user 10B is notified, via an AR/VR application 140 (FIG. 2) on the second camera-equipped device 130B, of an incoming video call from the first user 10A and prompted, via the same AR/VR application 140, to accept or decline the incoming video call. If the second user 10B declines or does not answer the incoming video call, the session terminates. If the second user 10B accepts or answers the incoming video call, the AR/VR application 140 on the second camera-equipped device 130B is configured to: (1) receive, as incoming video call data, the physical pose of the first HMD 110A, the physical pose of the first camera-equipped device 130A, the set of camera parameters, and the captured video from the first camera-equipped device 130A over the remote network connection, and (2) send the incoming video call data to the second HMD 110B over a local network connection.

In one embodiment, an AR/VR application 120 (FIG. 2) on the second HMD 110B is configured to: (1) receive the incoming video call data from the second camera-equipped device 130B over the local network connection, wherein the incoming video call data comprises the physical pose of the first HMD 110A, the physical pose of the first camera-equipped device 130A, the set of camera parameters, and the captured video, (2) determine a physical pose of the first user 10A and a camera capture volume of the camera 137 of the first camera-equipped device 130A based on the physical pose of the first HMD 110A, the physical pose of the first camera-equipped device 130A, and the set of camera parameters, and (3) send camera capture volume parameters indicative of the camera capture volume and the physical pose of the first user 10A to rendering systems 121, 122 (FIG. 5) and a shader 123 (FIG. 5) to render a representation (i.e., depth video representation, avatar representation, or combination of both) of the first user 10A on an AR display 117 of the second HMD 110B. In one embodiment, the physical pose of the first user 10A is indicative of a position of the first user 10A relative to the field of view of the camera 137.

In one embodiment, a camera capture volume of a camera 137 of a camera-equipped device 130 is a rectangular pyramid 350 (FIG. 8B) with four different planes aligned with an extent of a field of view of the camera 137 and two different planes representing near and far clipping planes of the camera 137. In another embodiment, the camera capture volume of the camera 137 is a sphere, a cylinder, or any other type of volume contained by the camera frustum of the camera 137.

Figure 5:
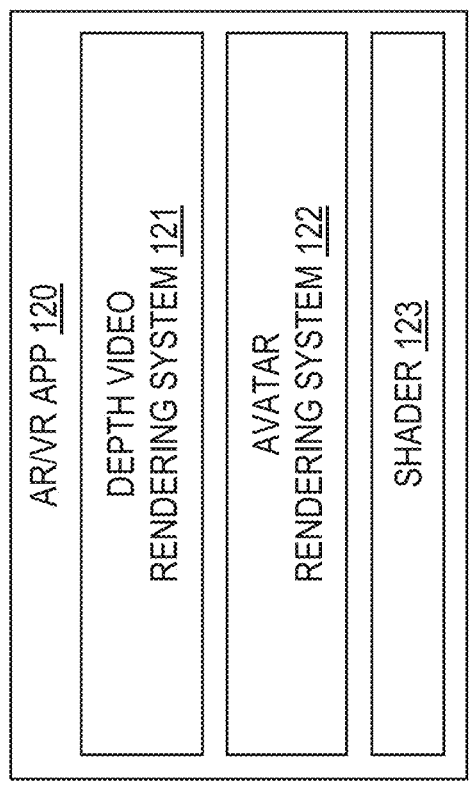
FIG. 5 illustrates an example augmented reality/virtual reality (AR/VR) application in detail, in one or more embodiments.

FIG. 5 illustrates an example AR/VR application 120 in detail, in one or more embodiments. In one embodiment, an AR/VR application 120 on a HMD 110 (e.g., second HMD 110B in FIG. 3) comprises: (1) a depth video rendering system 121 configured to render real image/depth video on an AR display 117 of the HMD 110 (e.g., a depth video representation of a first user 10A in FIG. 3), and (2) an avatar rendering system 122 configured to render a virtual avatar on the AR display 117 (e.g., an avatar representation of the first user 10A in FIG. 3).

In one embodiment, automatic representation toggling is implemented as follows: If a user 10 (e.g., the first user 10A) is completely outside of a field of view of a camera 137 of a camera-equipped device 130 (e.g., first camera-equipped device 130A in FIG. 3) positioned within proximity of the user 10, the user 10 is not visible to the camera 137. As the user 10 is completely outside of the field of view, video captured by the camera 137 does not include any image frames of the user 10. If the AR/VR application 120 receives the captured video, the AR/VR application 120 is configured to render, via the virtual avatar rendering system 122, a virtual avatar of the user 10 on the AR display 117.

If the user 10 is completely inside the field of view of the camera 137, the user 10 is visible to the camera 137. As the user 10 is completely inside the field of view, video captured by the camera 137 includes at least one image frame of the user 10. If the AR/VR application 120 receives the captured video, the AR/VR application 120 is configured to render, via the depth video rendering system 121, depth video of the user 10 on the AR display 117.

If the user 10 is partially inside the field of view of the camera 137, a portion of the user 10 is visible to the camera 137, and a remaining portion of the user 10 is not visible to the camera 137. As the user 10 is partially inside the field of view, video captured by the camera 137 includes at least one image frame of the portion of the user 10 that is visible to the camera 137; the captured video does not include any image frames of the remaining portion of the user 10 that is not visible to the camera 137. If the AR/VR application 120 receives the captured video, the AR/VR application 120 is configured to: (1) render, via the depth video rendering system 121, real image/depth video of the portion of the user 10 that is visible to the camera 137 on the AR display 117, and (2) render, via the virtual avatar rendering system 122, a virtual avatar of the remaining portion of the user 10 that is not visible to the camera 137 on the AR display 117. Rendering the virtual avatar allows the user 10 to walk around beyond the field of view of the camera 137 during a video call session.

In one embodiment, automatic representation toggling is enabled with either instant transition or blending transition. In one embodiment, if automatic representation toggling is enabled with instant transition, the depth video of the portion of the user 10 that is visible to the camera 137 instantly transitions to the virtual avatar of the remaining portion of the user 10 that is not visible to the camera 137 (i.e., there is no fading at an edge between the depth video and the virtual avatar). In one embodiment, if automatic representation toggling is enabled with blending transition instead, the depth video fades out at edges/limits of the field of view of the camera 137, and the virtual avatar fades out as the virtual avatar enters the field of view (i.e., there is fading at an edge between the depth video and the virtual avatar). The fade region of each representation (depth video, virtual avatar) overlaps in 3D space, making it appear as though one seamlessly transitions into the other.

In one embodiment, the AR/VR application 120 further comprises a shader 123. If automatic representation toggling is enabled with blending transition, the shader 123 is configured to fade an edge between a depth video representation and an avatar representation rendered on the AR display 117.

Figure 6A:
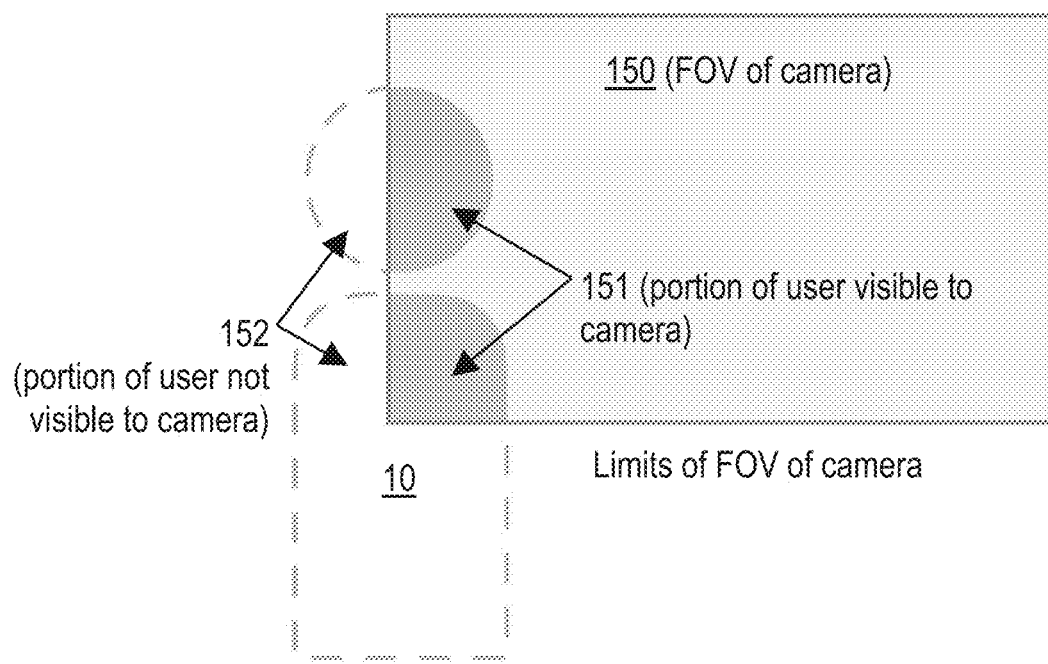
FIG. 6A illustrates a position of a user relative to a field of view of a camera, in one or more embodiments.

FIG. 6A illustrates a position of a user 10 relative to a field of view 150 of a camera 137 (FIG. 2), in one or more embodiments. The user 10 is positioned within proximity of a camera-equipped device 130 (FIG. 2) that includes the camera 137. If the user 10 is partially inside the field of view of the camera 137, only a portion 151 of the user 10 is visible to the camera 137. A remaining portion 152 of the user 10 is not visible to the camera 137. As such, video captured by the camera 137 comprises only image frames of the portion 151 of the user 10 that is visible to the camera 137; the captured video does not include any image frames of the portion 152 of the user 10 that is not visible to the camera 137.

With conventional technologies for video calls, the portion 152 of the user 10 that is not visible to the camera 137 is not rendered (on an AR display). With automatic representation toggling enabled, an AR/VR application 120 on a HMD 110 (e.g., second HMD 110B in FIG. 3) is configured to render the portion 152 of the user 10 that is not visible to the camera 137 as a virtual avatar 162 (FIG. 6B) on an AR display 117 of the HMD 110.

Figure 6B:
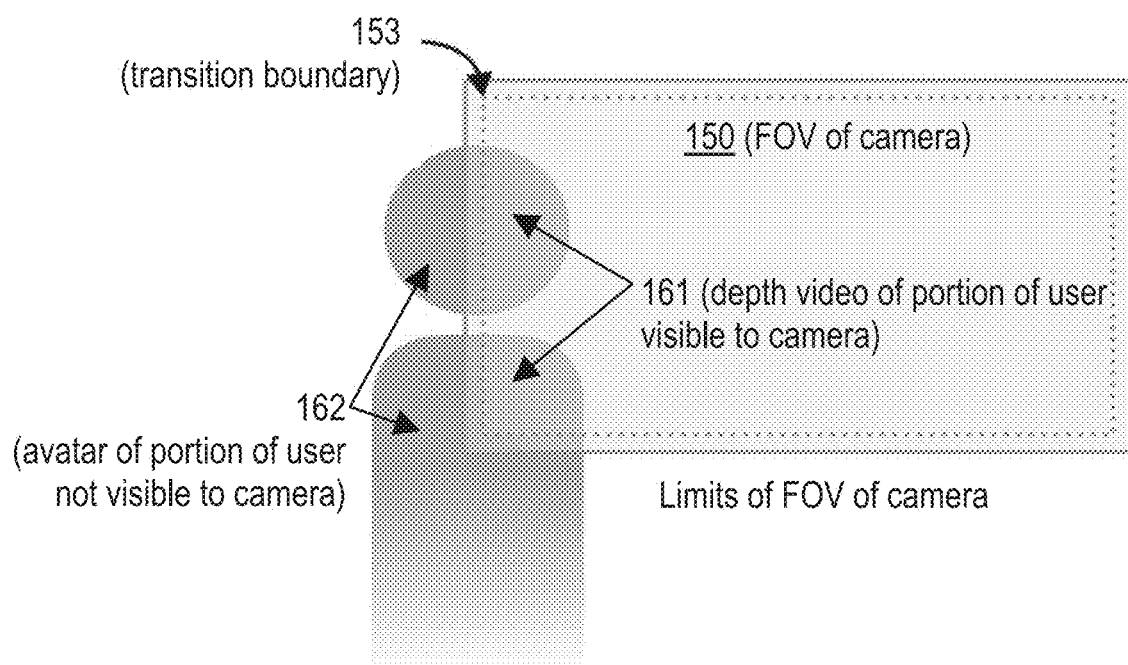
FIG. 6B illustrates an example depth video and avatar of the user in FIG. 6A, in one or more embodiments.

FIG. 6B illustrates an example depth video 161 and avatar 162 of the user 10 in FIG. 6A, in one or more embodiments. If automatic representation toggling is enabled, the AR/VR application 120 is configured to: (1) render, via a depth video rendering system 121 of the AR/VR application 120, the portion 151 of the user 10 that is visible to the camera 137 as the depth video 161, and (2) render, via an avatar rendering system 122 of the AR/VR application 120, the portion 152 of the user 10 that is not visible to the camera 137 as the virtual avatar 162.

In one embodiment, if automatic representation toggling is enabled with instant transition, the depth video 161 instantly transitions to the virtual avatar 162, i.e., the depth video 161 does not fade out at edges/limits of the field of view of the camera 137, and the virtual avatar 162 does not fade out as the virtual avatar 162 moves into the field of view. There is no fading at an edge between the depth video 161 and the virtual avatar 162 if automatic representation toggling is enabled with instant transition.

In one embodiment, if automatic representation toggling is enabled with blending transition, the virtual avatar 162 fades out as the virtual avatar 162 moves into the field of view of the camera 137, and the depth video 161 fades out at the edges/limits of the field of view. Specifically, any portion of the virtual avatar 162 inside a transition boundary 153 representing an edge between the depth video 161 and the virtual avatar 162 is faded out as the virtual avatar 162 moves into the field of view, and any portion of the depth video 162 inside the same transition boundary 153 is faded out. As shown in FIG. 6B, the transition boundary 153 is positioned near edges/limits of the field of view. The combined effect of fading the depth video 162 and the virtual avatar 162 in the same area (i.e., the transition boundary 153) makes it appear as though the depth video 161 blends into the virtual avatar 162.

In one embodiment, the AR/VR application 120 is configured to identify a transition boundary 153 near the edges/limits of the field of view, wherein a switch between the depth video 161 and the virtual avatar 162 occurs when the user 10 crosses the transition boundary 153.

In one embodiment, if automatic representation toggling is enabled with blending transition, the AR/VR application 120 is configured to fade, via a shader 123 of the AR/VR application 120, the edge between the depth video 161 and the virtual avatar 162 by: (1) performing an avatar fade process to fade the virtual avatar 162 out as the virtual avatar 162 enters the field of view of the camera 137, and (2) performing a depth video fade process to fade the depth video 161 out at edges/limits of the field of view.

Figure 7:
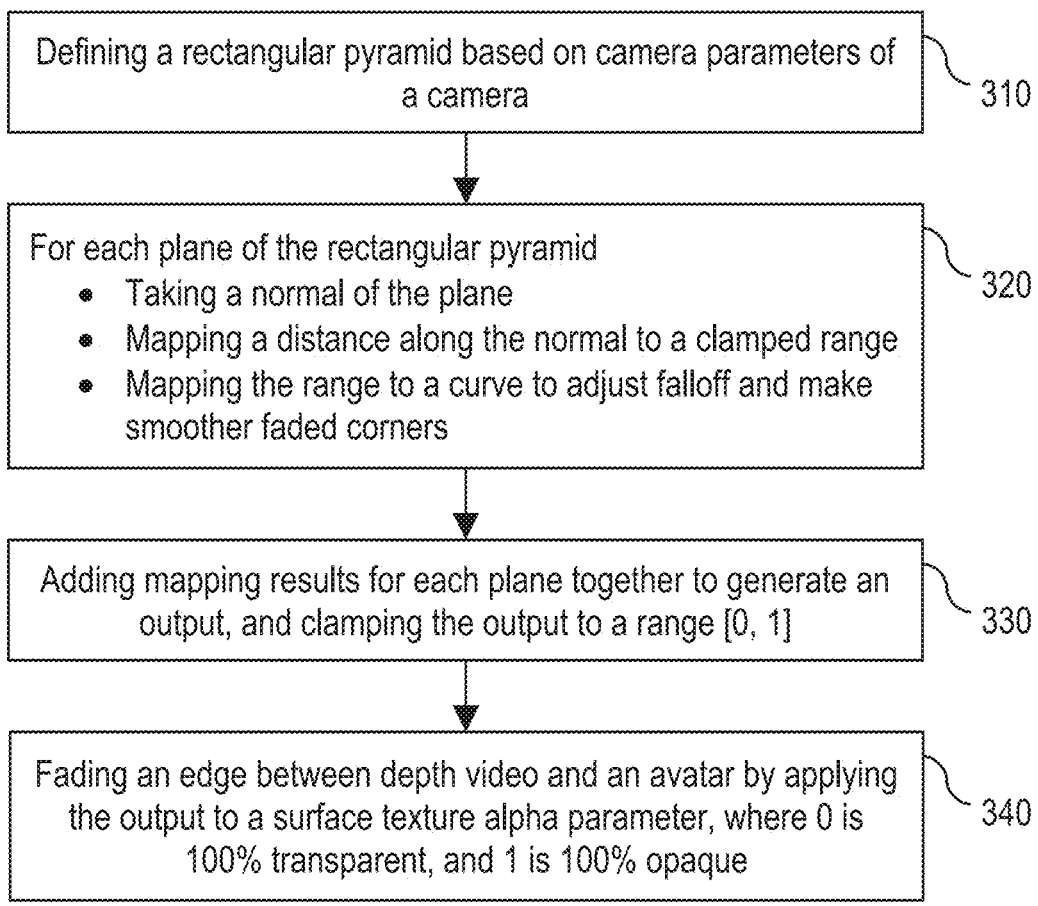
FIG. 7 is a flowchart of an example avatar fade process to fade a virtual avatar out as the virtual avatar enters a field of view of a camera, in one or more embodiments.

FIG. 7 is a flowchart of an example avatar fade process 300 to fade a virtual avatar out as the virtual avatar enters a field of view of a camera, in one or more embodiments. Process block 310 includes defining a rectangular pyramid (or a sphere, a cylinder, or any other type of volume) based on a set of camera parameters of the camera (e.g., camera 137). The set of camera parameters is indicative of the field of view (i.e., camera frustum) of the camera, a defined near clipping plane, and a defined far clipping plane. A normal of each clipping plane is facing in.

Process block 320 includes, for each plane of the rectangular pyramid, taking a normal of the plane, mapping a distance along the normal to a clamped range, and mapping the range to a curve to adjust falloff and make smoother faded corners. In one embodiment, the range is [$x_{start}$, $x_{end}$], wherein $x_{start}$ is a value from a minimum inset to a maximum inset, and $x_{end}$ is a value from 0 to 1.

Process block 330 includes adding mapping results for each plane together to generate an output, and clamping the output to a range [0, 1].

Process block 340 includes fading an edge between depth video (captured via the camera) and a virtual avatar by applying the output to a surface texture alpha parameter, where resulting surface texture is 100% transparent if 0, and resulting surface texture is 100% opaque if 1.

In one embodiment, process blocks 310-340 are performed by an AR/VR application 120 on a HMD 110 (e.g., second HMD 110B in FIG. 3 when rendering a first user 10A).

Figure 8A:
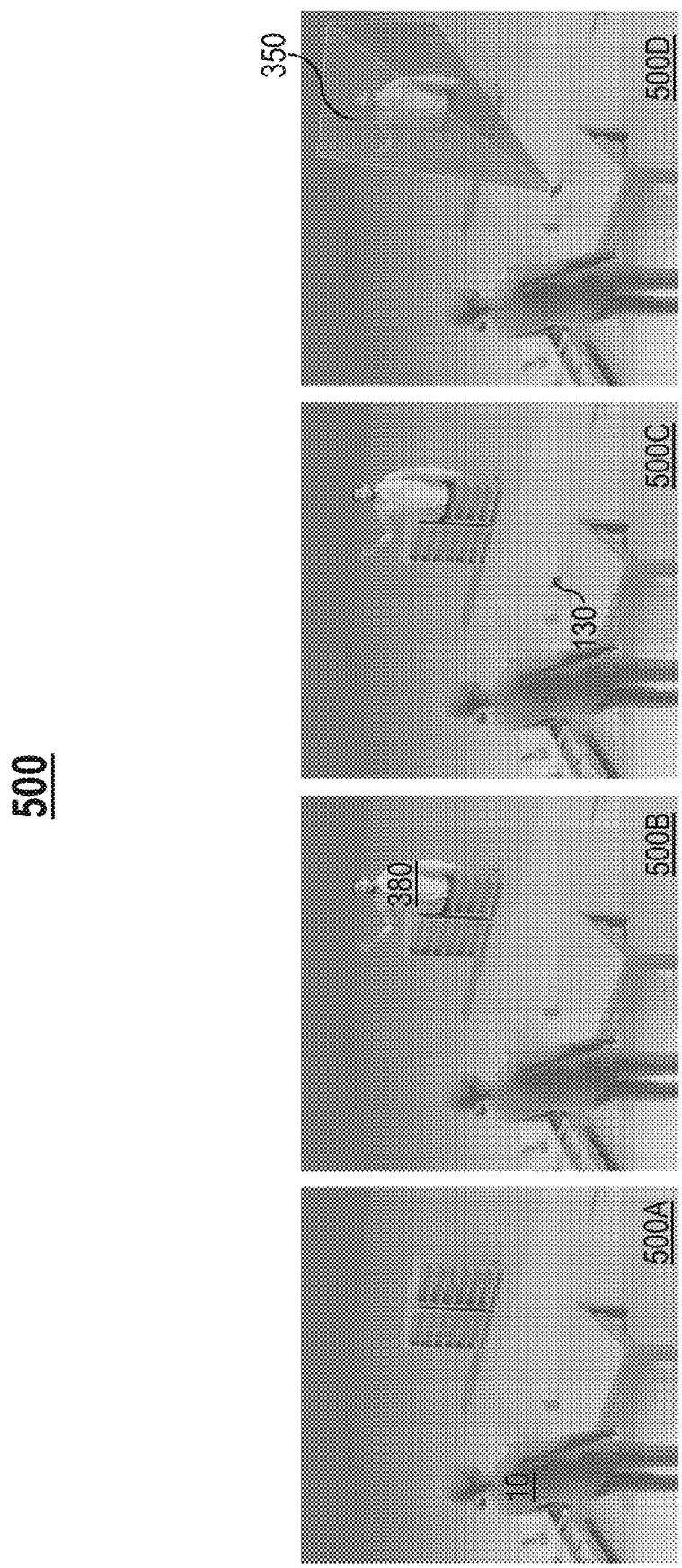
FIG. 8A is a sequence of panels illustrating a video call session between a first user and a second user, in one or more embodiments.

FIG. 8A is a sequence 500 of panels 500A-500D illustrating a video call session between a first user 10 (e.g., first user 10A in FIG. 3) and a second user 10 (e.g., second user 10B in FIG. 3), in one or more embodiments. Panel 500A shows a physical world, specifically the second user 10 in the second user's own space (i.e., user environment of the second user 10). Panel 500B shows an overlay of virtual content on the physical world, specifically a 3D image 380 of the first user 10. In one embodiment, the second user 10 views the 3D image 380 via a HMD 110 (e.g., second HMD 110B in FIG. 3) worn by the second user 10 (i.e., the 3D image 380 is rendered on an AR display 117 of the HMD 110). Panel 500C shows the overlay and, for illustration purposes only, a camera-equipped device 130 positioned within proximity of the first user 10 (e.g., first camera-equipped device 130B in FIG. 3). Panel 500D shows the overlay, the camera-equipped device 130, and, for illustration purposes only, a camera capture volume 350 of a camera 137 (FIG. 2) of the camera-equipped device 130.

Figure 8B:
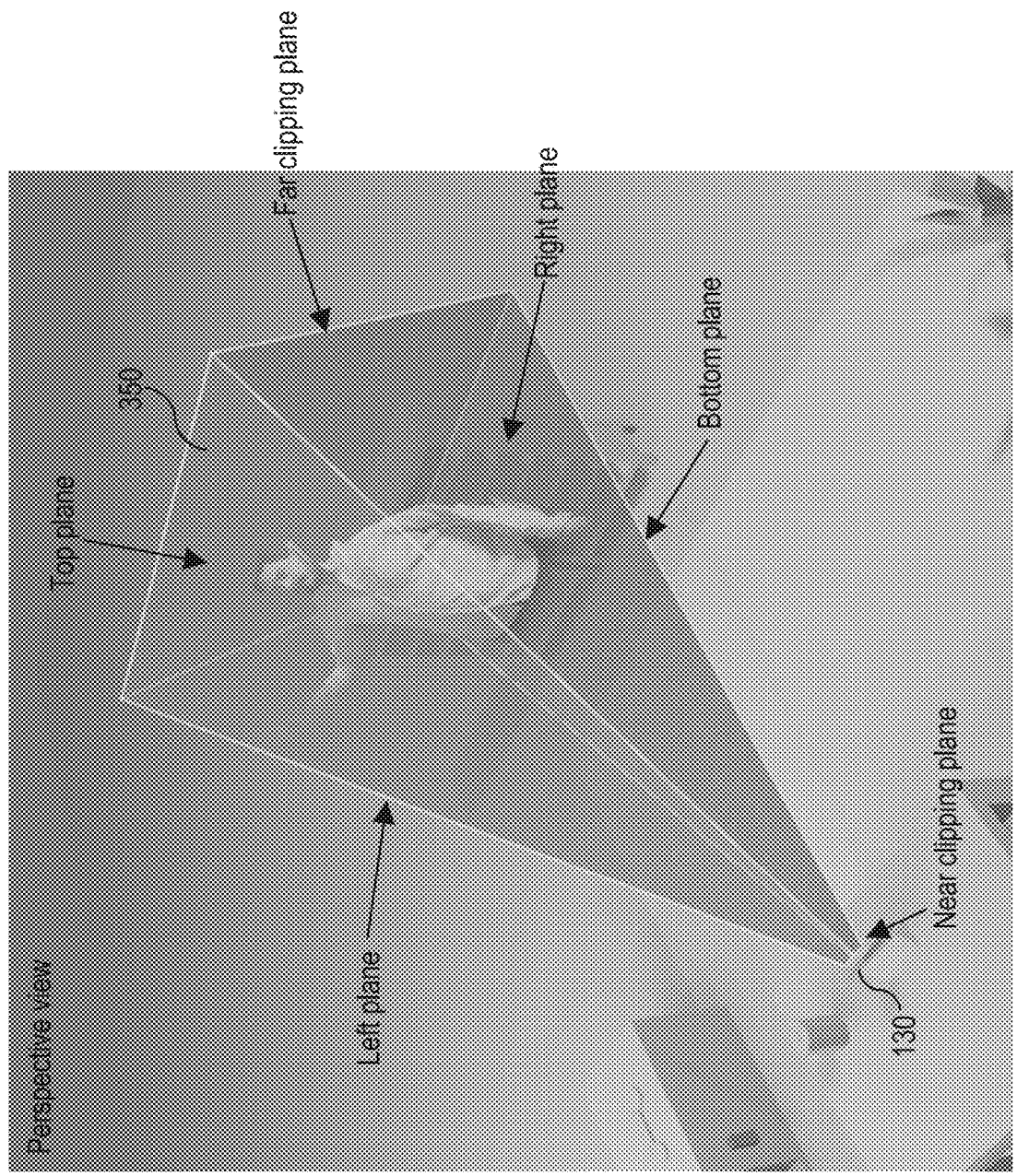
FIG. 8B is an external perspective view of the camera capture volume, in one or more embodiments.
Figures 8C, 8D, 8E:
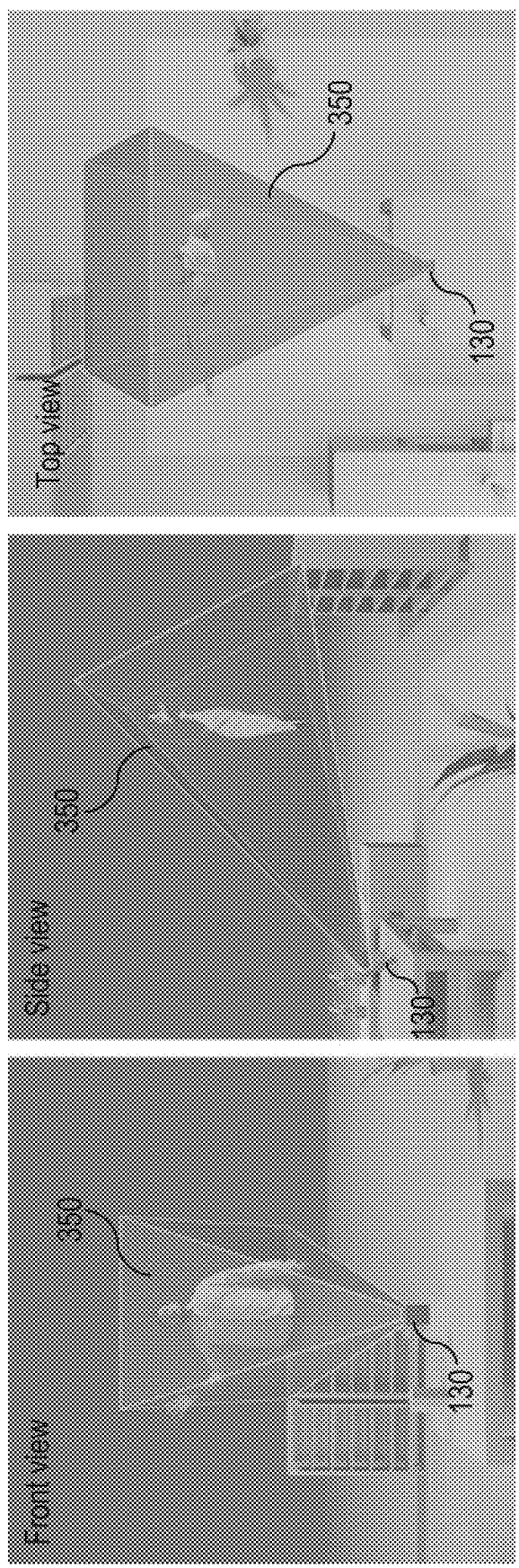
FIG. 8C is an external front view of the camera capture volume, in one or more embodiments.
FIG. 8D is an external side view of the camera capture volume, in one or more embodiments.
FIG. 8E is an external top view of the camera capture volume, in one or more embodiments.

FIGS. 8B-8E are different external views of the example camera capture volume 350 in FIG. 8A, in one or more embodiments. FIG. 8B is an external perspective view of the camera capture volume 350, in one or more embodiments. FIG. 8C is an external front view of the camera capture volume 350, in one or more embodiments. FIG. 8D is an external side view of the camera capture volume 350, in one or more embodiments. FIG. 8E is an external top view of the camera capture volume 350, in one or more embodiments. As shown in FIGS. 8B-8E, the camera capture volume 350 is a rectangular pyramid with four different planes aligned with an extent of a field of view of the camera 137 (FIG. 2) of the camera-equipped device 130, and two different planes representing near and far clipping planes of the camera 137. As shown in FIG. 8B, the four different planes aligned with the extent of the field of view comprises a left plane, a right plane, a top plane, and a bottom plane. As shown in FIGS. 8B-8E, if the first user 10 is partially inside the field of view, the 3D image 380 (FIG. 8A) includes both a depth video representation and an avatar representation of the first user 10. Specifically, a portion of the first user 10 visible to the camera 137 (i.e., inside the field of view) is rendered as depth video 370 (FIG. 9), and a remaining portion of the user 10 not visible to the camera 137 (i.e., outside of the field of view) is rendered as a virtual avatar 360 (FIG. 9).

Figure 9:
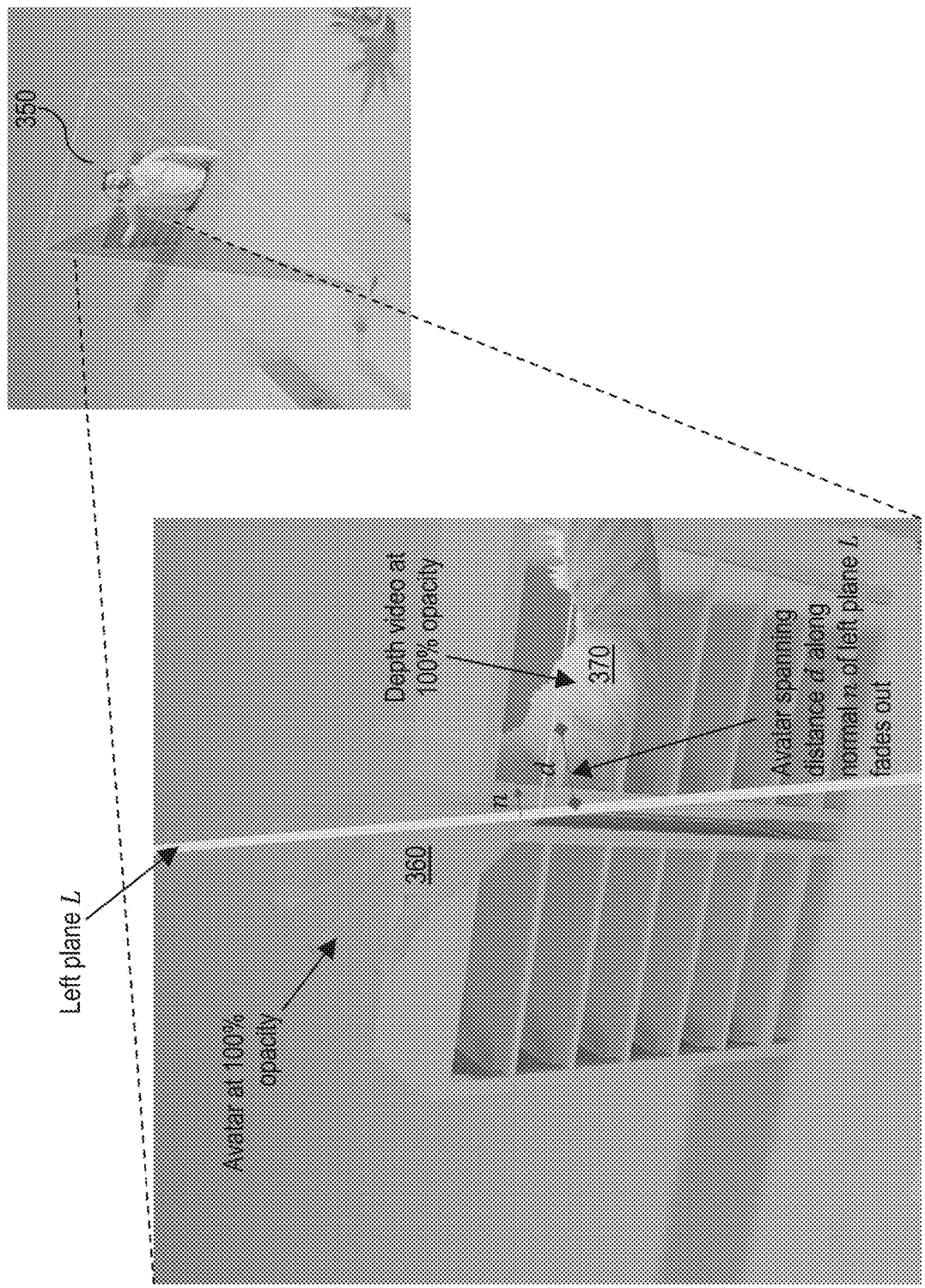
FIG. 9 is an expanded view of the left plane of the camera capture volume 350 and illustrates avatar fade, in one or more embodiments.

FIG. 9 is an expanded view of the left plane L of the camera capture volume 350 and illustrates avatar fade, in one or more embodiments. In FIG. 9, the left plane L appears as a line as the left plane L is aligned perpendicular to the expanded view. If a hand of the user 10 outside of the field of view of the camera 137 enters the field of view, a portion of the hand rendered as the virtual avatar 360 fades out in an edge between the virtual avatar 360 and the depth video 370. Specifically, as shown in FIG. 9, surface texture of a portion of the virtual avatar 360 outside of the field of view of the camera 137 is rendered at 100% opacity. As further shown in FIG. 9, surface texture of a remaining portion of the virtual avatar 360 that spans a distance d along a normal d of the left plane L fades out (the surface texture is rendered from 100% opacity to 100% transparency). As further shown in FIG. 9, the depth video 370 is rendered at 100% opacity.

Figure 10:
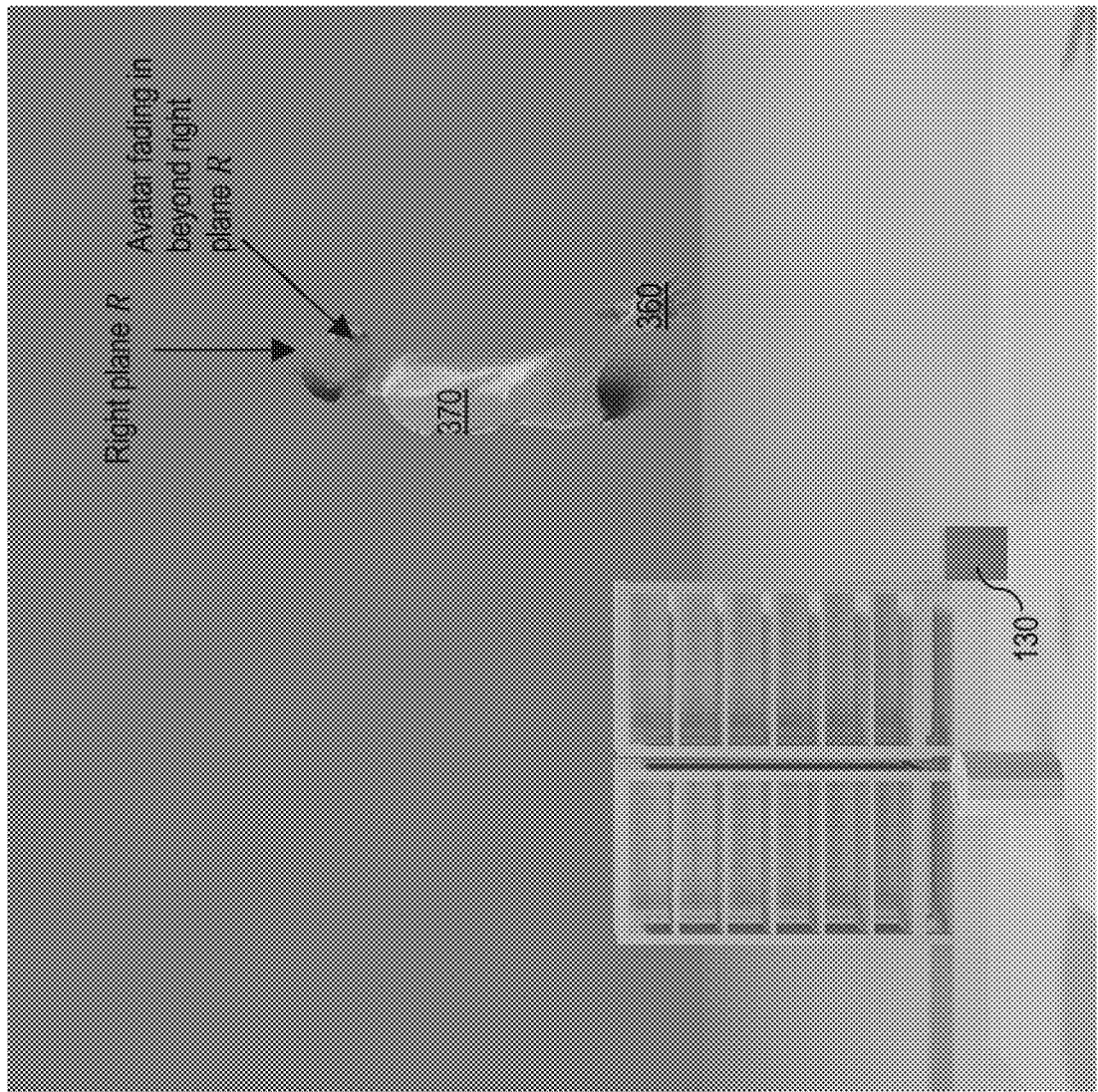
FIG. 10 is an external front view of the camera capture volume and illustrates avatar fade, in one or more embodiments.

FIG. 10 is an external front view of the camera capture volume 350 and illustrates avatar fade, in one or more embodiments. When applied to all planes aligned with the field of view of the camera 137, the virtual avatar 360 is only rendered when the user 10 moves beyond the camera capture volume 350 (i.e., exits/leaves the field of view). In one embodiment, if the user 10 inside the field of view of the camera 137 moves beyond the camera capture volume 350, the portion of the user 10 rendered as the virtual avatar 360 fades in at the edge between the virtual avatar 360 and the depth video 370. Specifically, as shown in FIG. 10, the virtual avatar 360 fades in beyond the right plane R of the camera capture volume 350 as the user 10 moves beyond the right plane R.

Figure 11:
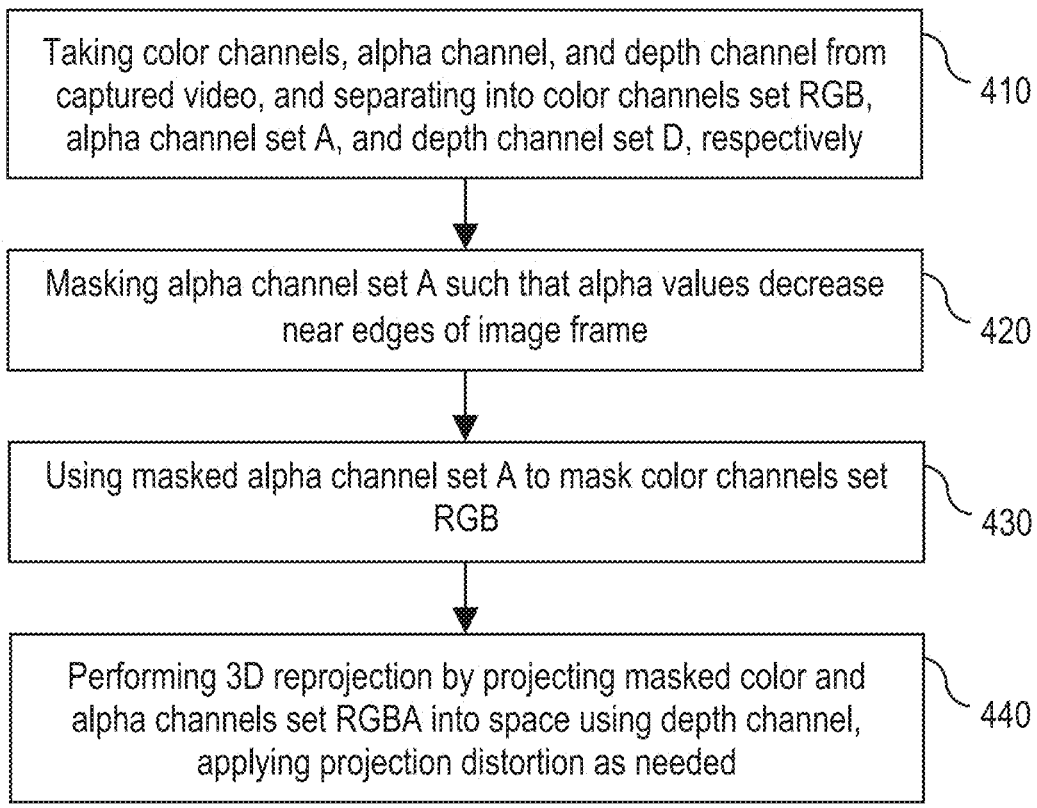
FIG. 11 is a flowchart of an example depth video fade process to fade depth video out at edges/limits of a field of view of a camera, in one or more embodiments.

FIG. 11 is a flowchart of an example depth video fade process 400 to fade depth video out at edges/limits of a field of view of a camera, in one or more embodiments. Process block 410 includes taking color channels, an alpha channel, and a depth channel from a video captured by the camera (e.g., camera 137 in FIG. 2), and separating into color channel sets RGB, alpha channel set A, and depth channel set D, respectively. The color channel sets RGB comprises an RGB image frame, the alpha channel set A comprises an alpha image frame, and the depth channel set D comprises a depth image frame.

Process block 420 includes masking the alpha channel set A such that alpha values decrease near edges of the alpha image frame. In one embodiment, a range by which alpha values decrease matches a range by which a virtual avatar fades (e.g., see process block 320 of process 300).

Process block 430 includes using masked alpha channel set A to mask color channels set RGB.

Process block 440 includes performing 3D reprojection by projecting masked color and alpha channels set RGBA into space using depth channel set D, applying projection distortion as needed.

In one embodiment, process blocks 410-440 are performed by an AR/VR application 120 on a HMD 110 (e.g., second HMD 110B in FIG. 3 when rendering a first user 10A).

Figure 12:
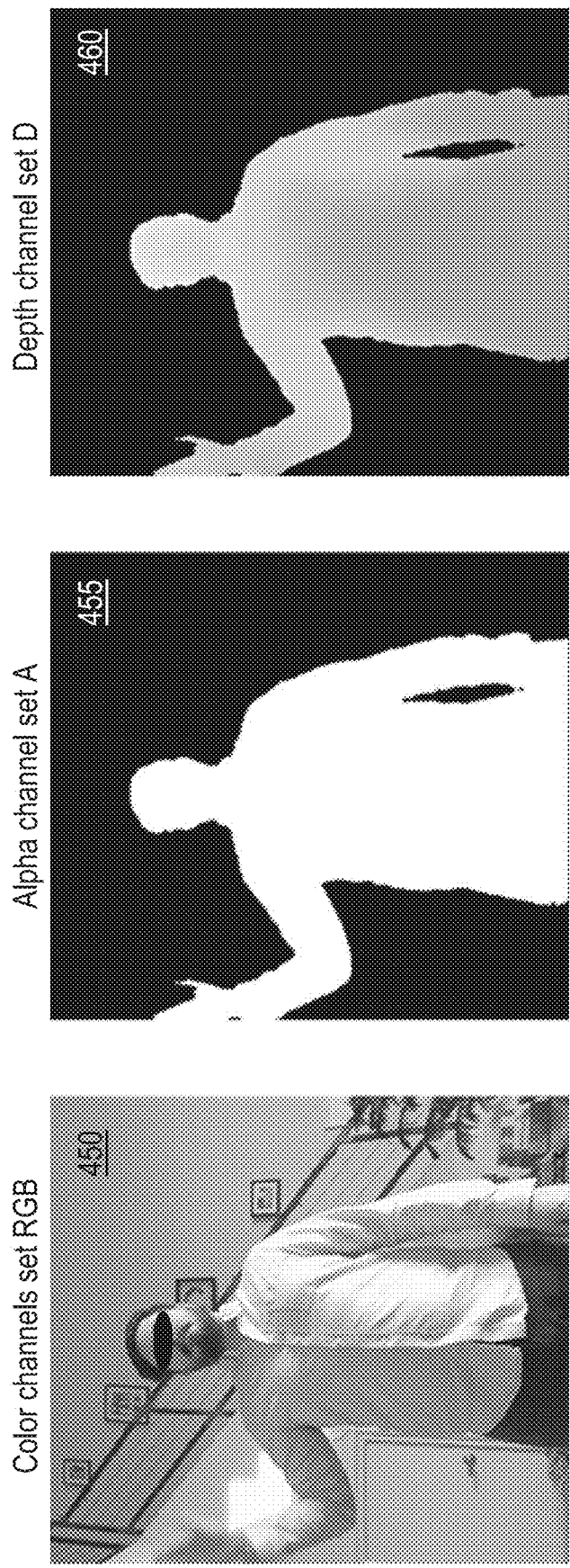
FIG. 12 illustrates different example channel sets, in one or more embodiments.

FIG. 12 illustrates different example channel sets, in one or more embodiments. In one embodiment, color channels, an alpha channel, and a depth channel taken from a captured video of a user 10 are separated into a color channels set RGB, an alpha channel set A, and a depth channel set D, respectively. The color channel sets RGB comprises an RGB image frame 450, the alpha channel set A comprises an alpha image frame 455, and the depth channel set D comprises a depth image frame 460.

Figure 13:
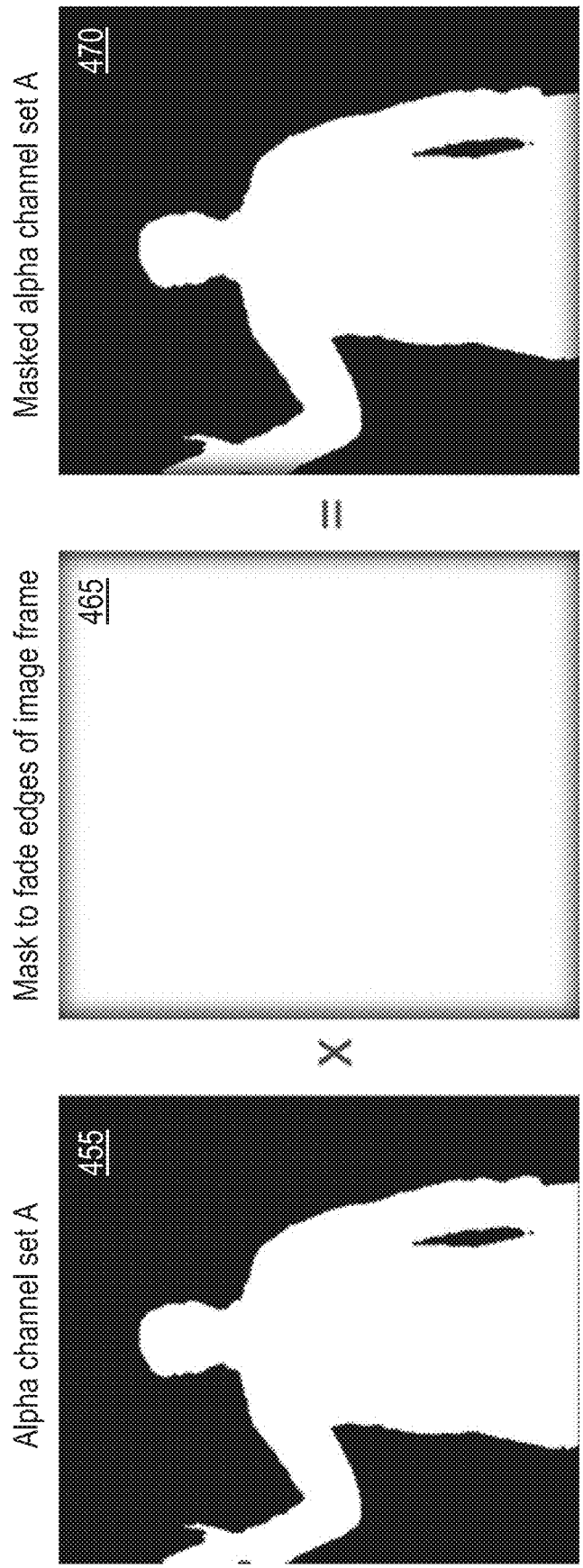
FIG. 13 illustrates masking the alpha channel set, in one or more embodiments.

FIG. 13 illustrates masking the alpha channel set A, in one or more embodiments. In one embodiment, a masking function 465 is applied to the alpha channel set A to mask edges of the alpha image frame 455. Applying the masking function 465 decreases alpha values of the alpha image frame 455 near the edges of the alpha image frame 455, resulting in a masked alpha channel set A comprising a masked alpha image frame 470.

Figure 14:
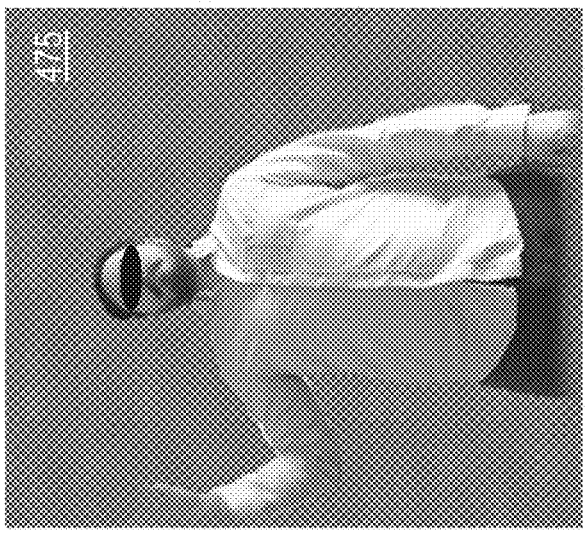
FIG. 14 illustrates masking the color channels set, in one or more embodiments.
Figure 14:
Figure 14:

FIG. 14 illustrates masking the color channels set RGB, in one or more embodiments. In one embodiment, the color channels set RGB is masked using the masked alpha channel set A, resulting in a masked color and alpha channels set RGBA comprising a masked color and alpha image frame 475.

Figure 15:
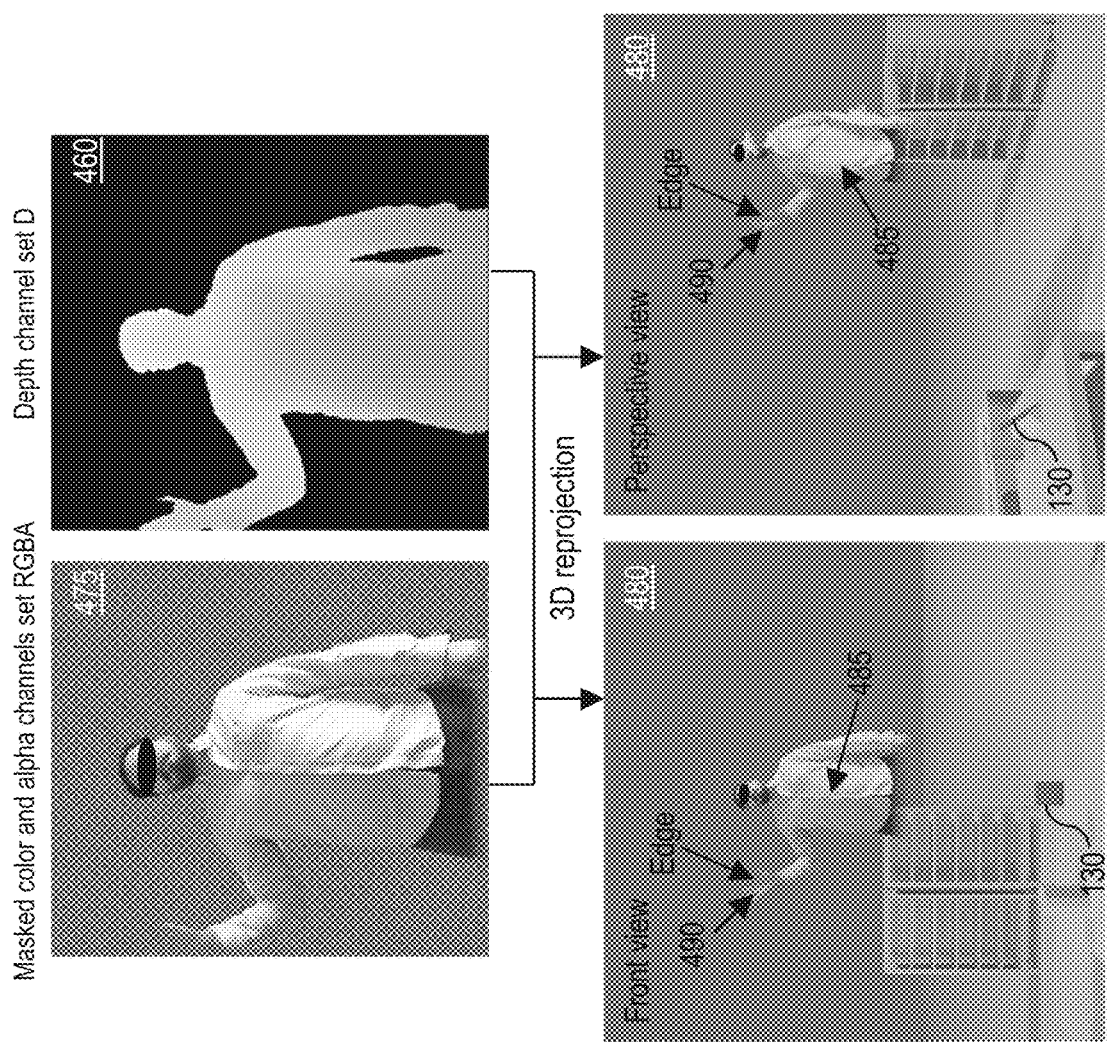
FIG. 15 illustrates an example 3D reprojection, in one or more embodiments.

FIG. 15 illustrates an example 3D reprojection, in one or more embodiments. In one embodiment, the 3D reprojection comprises projecting the masked color and alpha channels set RGBA into space using the depth color channel set D, resulting in a 3D image 480. The 3D image 480 is shown in FIG. 15 from an external front view and an external perspective view. A portion of a user 10 inside a field of view of a camera 137 (FIG. 2) of a camera-equipped device 130 is rendered as depth video 485 in the 3D image 480, and a remaining portion of the user 10 outside of the field of view is rendered as a virtual avatar 490 in the 3D image 480. As shown in FIG. 15, the depth video 485 fades out at an edge between the depth video 485 and the virtual avatar 490, wherein the edge is about an edge/limit of the field of view. In one embodiment, the 3D reprojection further comprises applying a projection distortion as needed.

Figure 16:
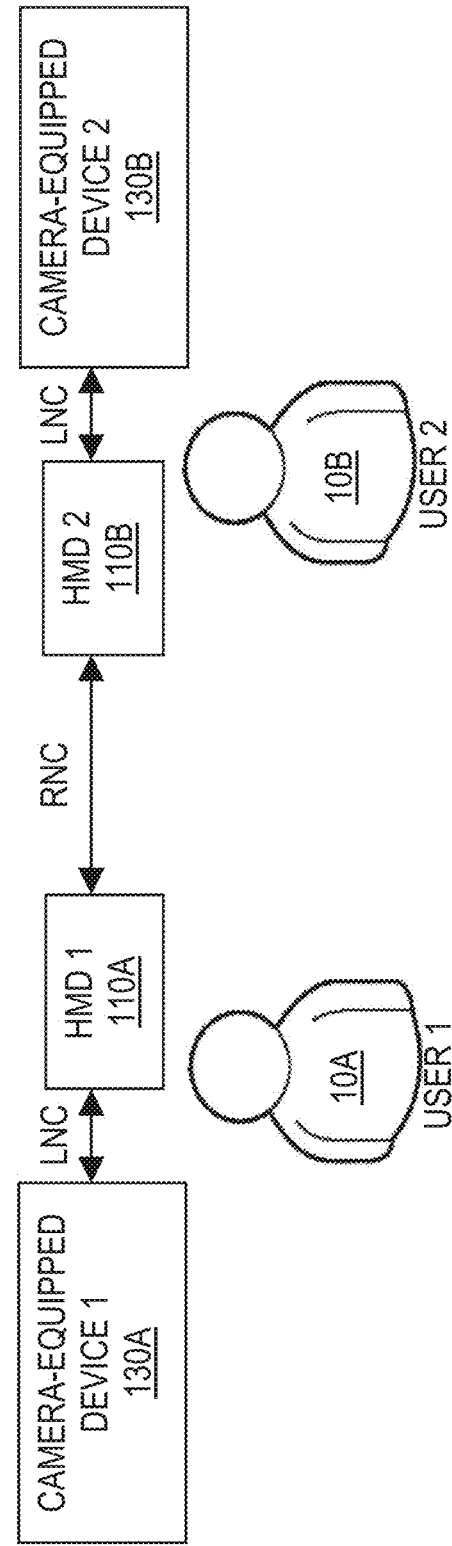
FIG. 16 illustrates another example system for automatic representation toggling, in one or more embodiments.

FIG. 16 illustrates another example system 210 for automatic representation toggling, in one or more embodiments. The system 210 is similar to system 200 (FIG. 3), with the exception that in the system 210 the first HMD 110A and the second HMD 110B exchange data with each other over a remote network connection (RNC).

Figure 17:
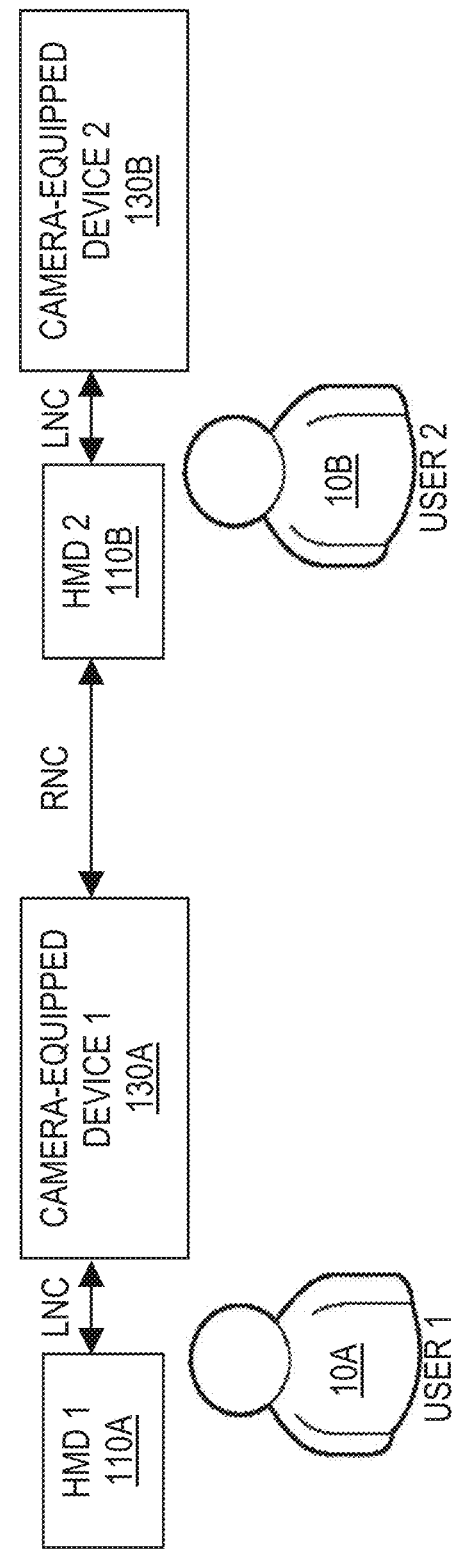
FIG. 17 illustrates another example system for automatic representation toggling, in one or more embodiments.

FIG. 17 illustrates another example system 220 for automatic representation toggling, in one or more embodiments. The system 220 is similar to system 200 (FIG. 3), with the exception that in the system 220 the first camera-equipped device 130A and the second HMD 110B exchange data with each other over a remote network connection (RNC).

Figure 18:
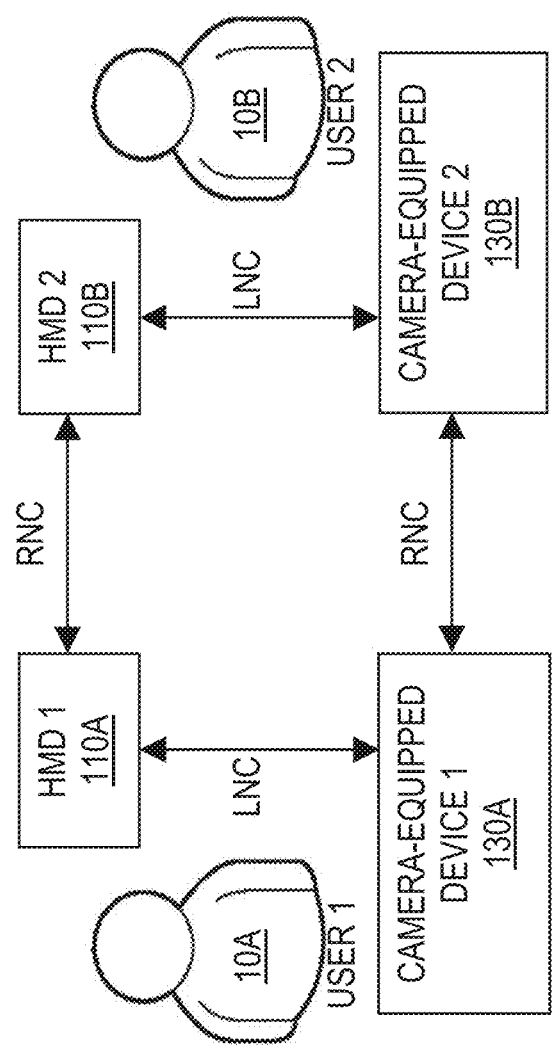
FIG. 18 illustrates another example system for automatic representation toggling, in one or more embodiments.

FIG. 18 illustrates another example system 230 for automatic representation toggling, in one or more embodiments. The system 230 is similar to system 200 (FIG. 3), with the exception that in the system 230 the first HMD 110A and the second HMD 110B exchange data with each other over a remote network connection, and the first camera-equipped device 130A and the second camera-equipped device 130B exchange data with each other over the remote network connection.

Figure 19:
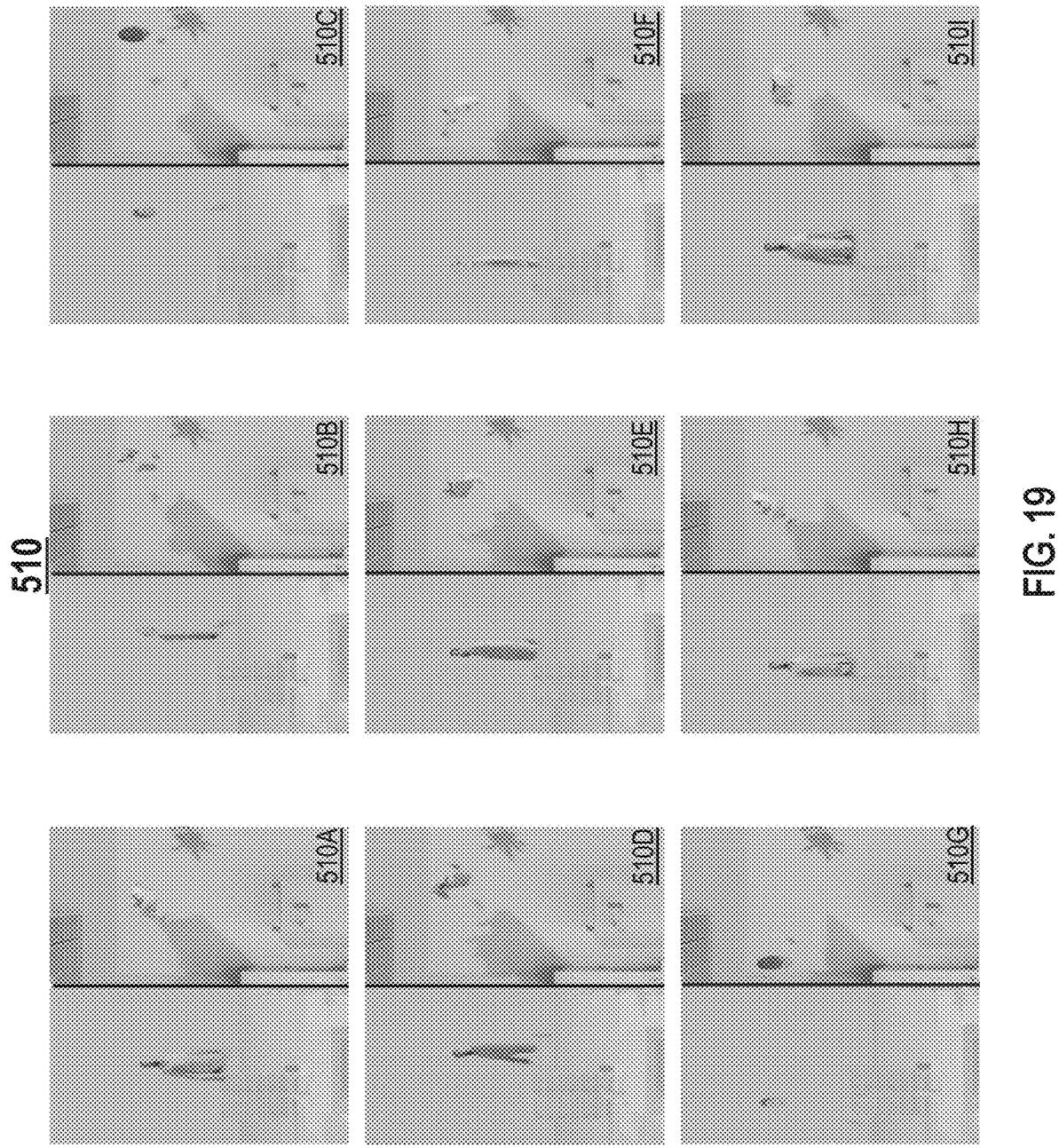
FIG. 19 is a sequence of panels illustrating 3D images of a user rendered on an AR display of a HMD during a video call session, in one or more embodiments.

FIG. 19 is a sequence 510 of panels 510A-510I illustrating 3D images of a user 10 (FIG. 1) rendered on an AR display 117 of a HMD 110 during a video call session, in one or more embodiments. Each panel 510A-510I shows both an external front view and an external top view of a 3D image of the user 10. As shown in FIGS. 510A-510I, as the user 10 moves around the user's own space (i.e., user environment of the user 10), a representation of the user 10 rendered on the AR display 117 toggles among a depth video representation, an avatar representation, or a combination of both. Any depth video representation rendered fades out at edges/limits of a field of view of a camera 137 used to capture video of the user 10. Any avatar representation rendered fades out as the virtual avatar representation enters the field of view.

Figure 20:
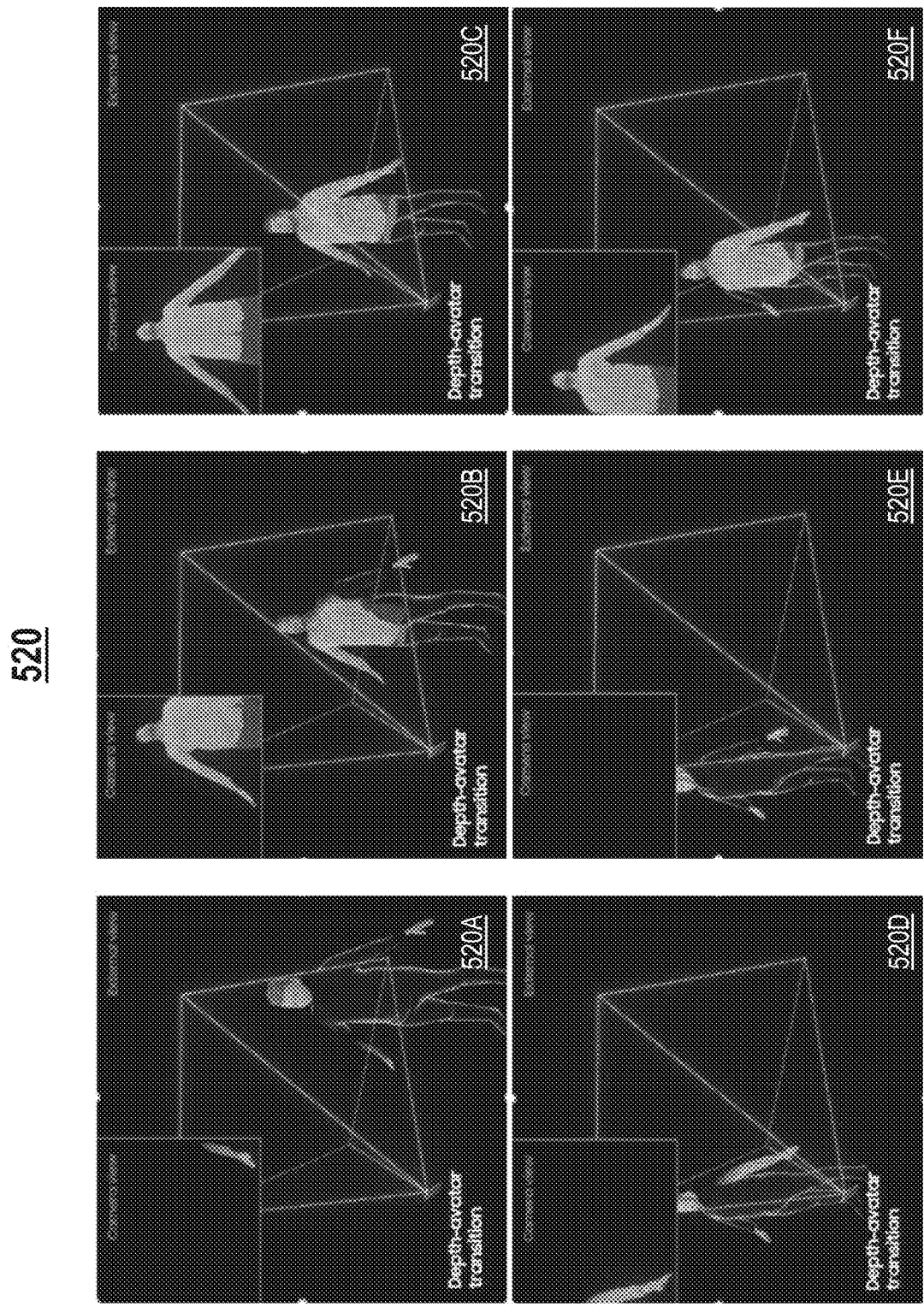
FIG. 20 is a sequence of panels illustrating transitions between a depth video representation and an avatar representation of a user during a video call session, in one or more embodiments.

FIG. 20 is a sequence 520 of panels 520A-520F illustrating transitions between a depth video representation and an avatar representation of a user 10 (FIG. 1) during a video call session, in one or more embodiments. Each panel 520A-520F shows both an external perspective view of the representations and a camera view representing a field of view of a camera 137 (FIG. 2) used to capture video of the user 10. As shown in FIGS. 520A-520F, as the user 10 moves around the user's own space (i.e., user environment of the user 10), the depth video representation fades out at edges/limits of the field of view, and the virtual avatar representation fades out as the virtual avatar representation enters the field of view.

Figure 21:
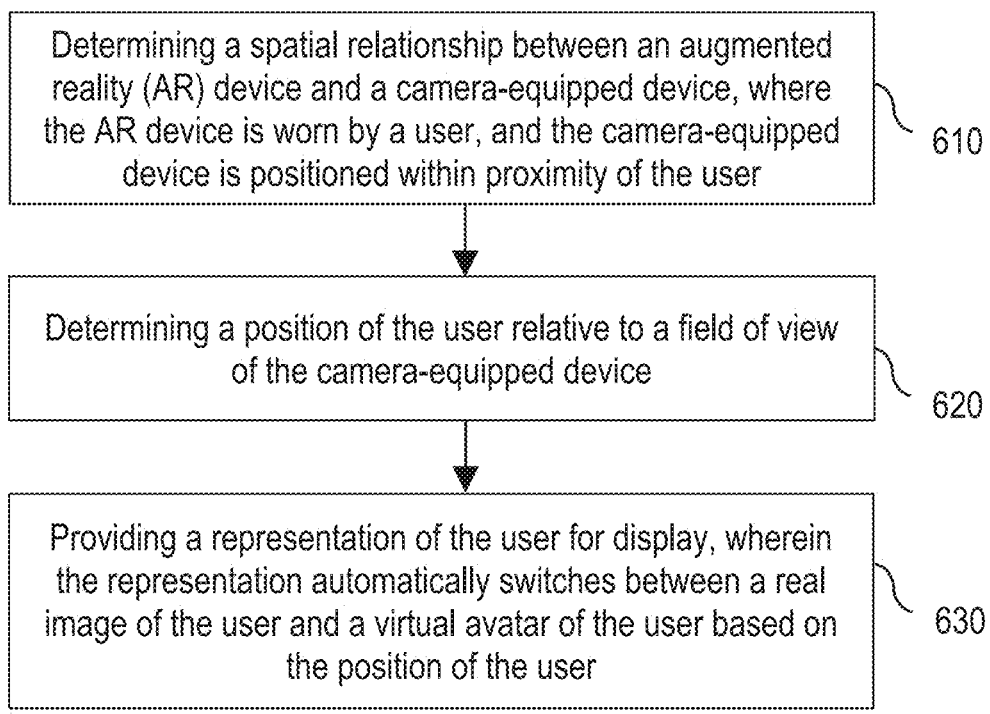
FIG. 21 is a flowchart of an example process for automatic representation toggling, in one or more embodiments.

FIG. 21 is a flowchart of an example process 600 for automatic representation toggling, in one or more embodiments. Process block 610 includes determining a spatial relationship between an AR device (e.g., HMD 110) and a camera-equipped device (e.g., camera-equipped device 130), wherein the AR device is worn by a user (e.g., user 10), and the camera-equipped device is positioned within proximity of the user. Process block 620 includes determining a position of the user relative to a field of view of the camera-equipped device (e.g., camera 137 of the camera-equipped device 130). Process block 630 includes providing a representation of the user for display (e.g., on an AR display 117 of another HMD 110), where the representation automatically switches between a real image (depth video) of the user and a virtual avatar of the user based on the position of the user.

In one embodiment, process blocks 610-630 may be performed by one or more components of the systems 200, 210, 220, or 230, such as a AR/VR application 120 on a HMD 110, or a AR/VR application 140 on a camera-equipped device 130.

Figure 22:
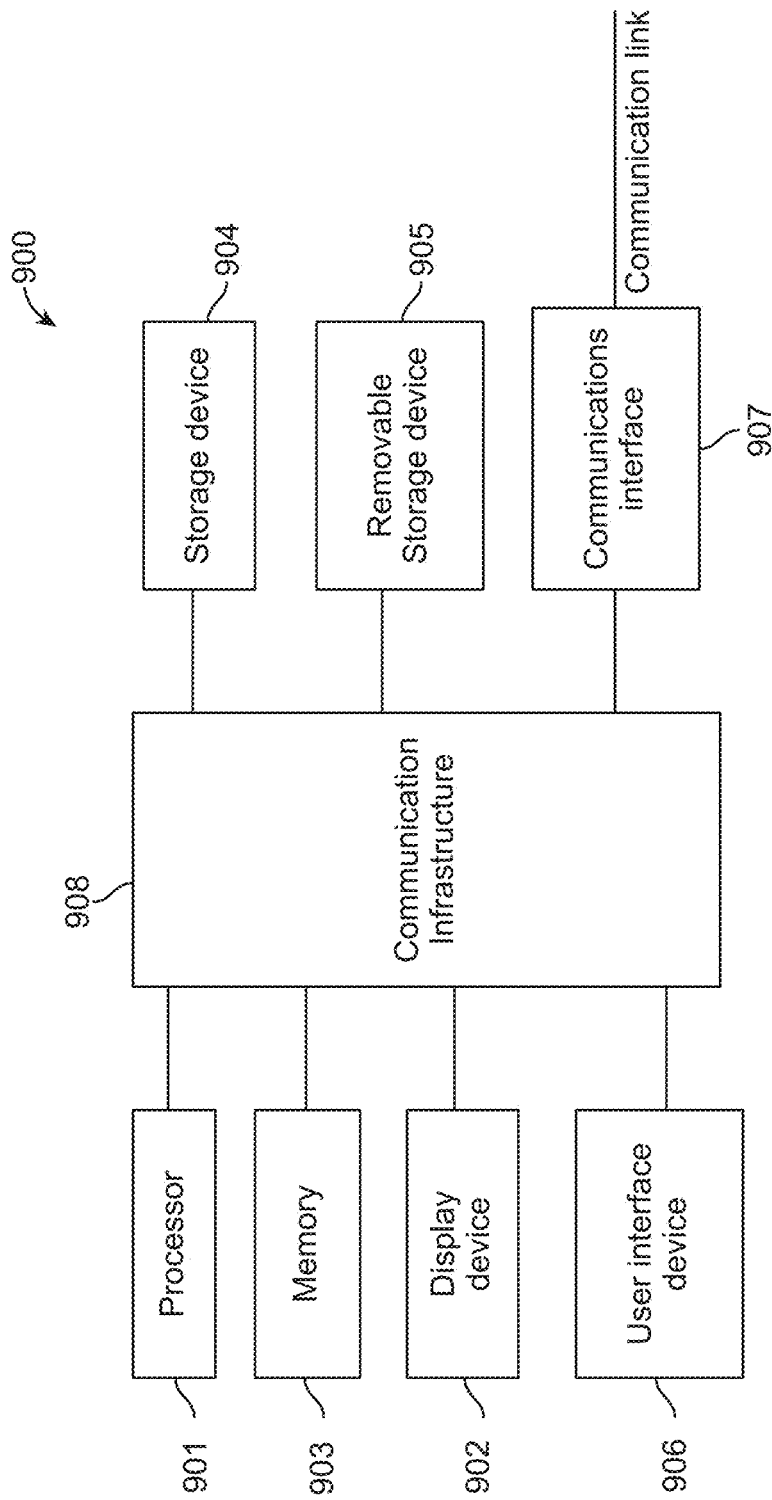
FIG. 22 is a high-level block diagram showing an information processing system comprising a computer system useful for implementing the disclosed embodiments.

FIG. 22 is a high-level block diagram showing an information processing system comprising a computer system 900 useful for implementing the disclosed embodiments. Computer system 900 may be incorporated the HMD 110, the camera-equipped device 130, the remote AR device 160, and/or the remote user device 165. The computer system 900 includes one or more processors 901, and can further include an electronic display device 902 (for displaying video, graphics, text, and other data), a main memory 903 (e.g., random access memory (RAM)), storage device 904 (e.g., hard disk drive), removable storage device 905 (e.g., removable storage drive, removable memory module, a magnetic tape drive, optical disk drive, computer readable medium having stored therein computer software and/or data), viewer interface device 906 (e.g., keyboard, touch screen, keypad, pointing device), and a communication interface 907 (e.g., modem, a network interface (such as an Ethernet card), a communications port, or a PCMCIA slot and card). The communication interface 907 allows software and data to be transferred between the computer system and external devices. The system 900 further includes a communications infrastructure 908 (e.g., a communications bus, cross-over bar, or network) to which the aforementioned devices/modules 901 through 907 are connected.

Information transferred via communications interface 907 may be in the form of signals such as electronic, electromagnetic, optical, or other signals capable of being received by communications interface 907, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 300 (FIG. 4), processing instructions for process 400 (FIG. 11), and/or processing instructions for process 600 (FIG. 21) may be stored as program instructions on the memory 903, storage device 904 and the removable storage device 905 for execution by the processor 901.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein

What is claimed is:

1. A method, comprising:
   determining a spatial relationship between an augmented reality (AR) device and a camera-equipped device, wherein the AR device is worn by a user, and the camera-equipped device is positioned within proximity of the user;
   determining a position of the user relative to a field of view of the camera-equipped device; and
   providing a representation of the user for display, wherein the representation automatically switches between a real image of the user and a virtual avatar of the user based on the position of the user.

2. The method of claim 1, further comprising:
   displaying the representation on a different AR device.

3. The method of claim 1, wherein the real image is provided for display if the position of the user is inside the field of view.

4. The method of claim 1, wherein the virtual avatar is provided for display if the position of the user is outside of the field of view.

5. The method of claim 1, wherein a combination of the real image and the virtual avatar is provided for display if the position of the user is partially inside the field of view.

6. The method of claim 5, further comprising:
   fading an edge between the real image and the virtual avatar.

7. The method of claim 6, wherein fading the edge between the real image and the virtual avatar comprises:
   fading the real image out at limits of the field of view; and
   fading the virtual avatar out as the position of the user enters the field of view.

8. The method of claim 1, further comprising:
   identifying a transition boundary within proximity of the field of view, wherein the representation automatically switches if the position of the user crosses the transition boundary.

9. The method of claim 1, wherein determining the spatial relationship comprises:
   determining a physical pose of the AR device, a physical pose of the camera-equipped device, the field of view, a near clipping plane of the camera-equipped device, and a far clipping plane of the camera-equipped device.

10. A system, comprising:
    at least one processor; and
    a non-transitory processor-readable memory device storing instructions that when executed by the at least one processor causes the at least one processor to perform operations including:
       determining a spatial relationship between an augmented reality (AR) device and a camera-equipped device, wherein the AR device is worn by a user, and the camera-equipped device is positioned within proximity of the user;
       determining a position of the user relative to a field of view of the camera-equipped device; and
       providing a representation of the user for display, wherein the representation automatically switches between a real image of the user and a virtual avatar of the user based on the position of the user.

11. The system of claim 10, further comprising:
    displaying the representation on a different AR device.

12. The system of claim 10, wherein the real image is provided for display if the position of the user is inside the field of view.

13. The system of claim 10, wherein the virtual avatar is provided for display if the position of the user is outside of the field of view.

14. The system of claim 10, wherein a combination of the real image and the virtual avatar is provided for display if the position of the user is partially inside the field of view.

15. The system of claim 14, wherein the operations further comprise:
    fading an edge between the real image and the virtual avatar.

16. The system of claim 15, wherein fading the edge between the real image and the virtual avatar comprises:
    fading the real image out at limits of the field of view; and
    fading the virtual avatar out as the position of the user enters the field of view.

17. The system of claim 10, wherein the operations further comprise:

identifying a transition boundary within proximity of the field of view, wherein the representation automatically switches if the position of the user crosses the transition boundary.

18. The system of claim 10, wherein determining the spatial relationship comprises:
determining a physical pose of the AR device, a physical pose of the camera-equipped device, the field of view, a near clipping plane of the camera-equipped device, and a far clipping plane of the camera-equipped device.

19. A non-transitory computer readable storage medium including instructions for execution by at least one processor to perform a method comprising:
determining a spatial relationship between an augmented reality (AR) device and a camera-equipped device, wherein the AR device is worn by a user, and the camera-equipped device is positioned within proximity of the user;
determining a position of the user relative to a field of view of the camera-equipped device; and
providing a representation of the user for display, wherein the representation automatically switches between a real image of the user and a virtual avatar of the user based on the position of the user.

20. The non-transitory computer readable storage medium of claim 19, wherein the real image is provided for display if the position of the user is inside the field of view, the virtual avatar is provided for display if the position of the user is outside of the field of view, and a combination of the real image and the virtual avatar is provided for display if the position of the user is partially inside the field of view.

\* \* \* \* \*